United States Patent
Kadtke et al.

(10) Patent No.: US 6,401,057 B1
(45) Date of Patent: Jun. 4, 2002

(54) DETECTION AND CLASSIFICATION SYSTEM FOR ANALYZING DETERMINISTIC PROPERTIES OF DATA USING CORRELATION PARAMETERS

(75) Inventors: James B. Kadtke, La Jolla; Michael N. Kremliovsky, San Diego, both of CA (US)

(73) Assignee: Nonlinear Solutions, Inc., Stafford, VA (US)

( * ) Notice: Subject to any disclaimer, the term of this patent is extended or adjusted under 35 U.S.C. 154(b) by 0 days.

(21) Appl. No.: 09/191,988

(22) Filed: Nov. 13, 1998

Related U.S. Application Data

(60) Provisional application No. 60/051,579, filed on Jul. 2, 1997.

(51) Int. Cl.[7] ............................. H03F 1/26; G06F 19/00
(52) U.S. Cl. ............................ 702/189; 702/22; 702/30
(58) Field of Search ............................. 702/22, 30, 189

(56) References Cited

U.S. PATENT DOCUMENTS

| | | | |
|---|---|---|---|
| 5,057,992 A | * 10/1991 | Traiger | 364/148 |
| 5,277,053 A | * 1/1994 | McLane et al. | 73/10 |
| 5,652,713 A | * 7/1997 | Chandler | 364/572 |
| 5,867,807 A | * 2/1999 | Yamada et al. | 702/30 |
| 5,884,245 A | * 3/1999 | Chandler | 742/189 |
| 6,278,961 B1 | * 8/2001 | Kadtke et al. | 702/189 |

FOREIGN PATENT DOCUMENTS

JP 2000059332 * 2/2000

OTHER PUBLICATIONS

Broomhead and King, "Extracting Qualitative Dynamics From Experimental Data" *Physica* 20D:217–236 (1986).
Crutchfield and McNamara, "Equations of Motion from a Data Series" *Journal of Complex Systems 1* 1–26 (1987).
Dzwinel, W., "How To Make Sammon's Mapping Useful For Multidimensional Data Structures Analysis" *Pattern Recognition* 27 (7):949–959 (1994).
Gouesbet and Letellier, "Global vector–field reconstruction by using a multivariate polynominal $L_2$ approximation on nets" *Physical Review E* 49 (6):4955–4972 (1944).
Kadtke and Kremliovsky, "Estimating statistics for detecting determinism using global dynamical models" *Physics Letters A* 229:97–106 (1997).
Kadtke, J., "Classification of highly noisy signals using global dynamical models" *Physics Letters A* 203:196–202 (1995).
Meraim, et al., "Blind System Identification" *Proceedings of the IEEE* 85 (8):1310–1322 (1997).
Proakis et al., *Introduction to Digital Signal Proceedings*, pp. 795–849, Macmillan (1988).
Ray and Turner, "Mahalanobis Distance–Based Two New Feature Evaluation Criteria" *Information Sciences* 60:217–245 (1992).
Rössler, O.E., "An Equation For Continuous Chaos" *Physics Letters* 57A (5):397–398 (1976).
Rotman, J., "Flipper's Secret" *New Scientist* fl–85:34–39 (1997).
Streit and Luginbuhl, "Maximum Likelihood Training of Probabilistic Neural Networks" *IEEE Transactions on Neural Networks* 5 (5):764–783 (1994).

* cited by examiner

*Primary Examiner*—John S. Hilten
*Assistant Examiner*—Charles H. Nolan, Jr.
(74) *Attorney, Agent, or Firm*—Robroy R. Fawcett

(57) ABSTRACT

A signal detection and classification technique that provides robust decision criteria for a wide range of parameters and signals in the presence of noise and interfering signals. The technique uses dynamical models for deriving filters and classifiers optimized for a particular category of signals of interest. The dynamical filters and classifiers can be implemented based on nonlinear dynamical principles. The invention is able to efficiently reveal deterministic properties of observed data signals in a numerically fast and efficient manner.

14 Claims, 30 Drawing Sheets

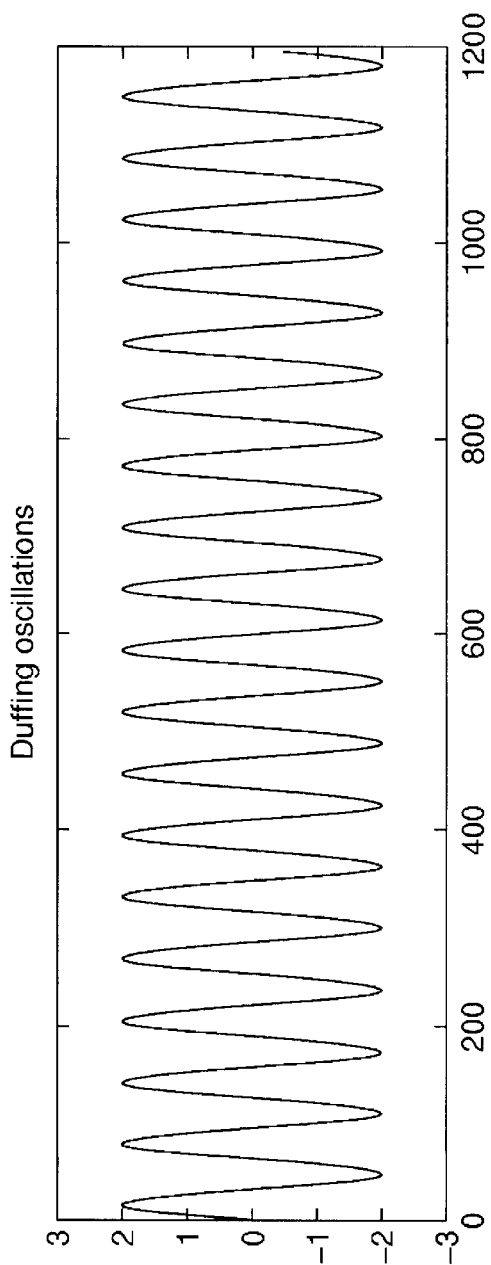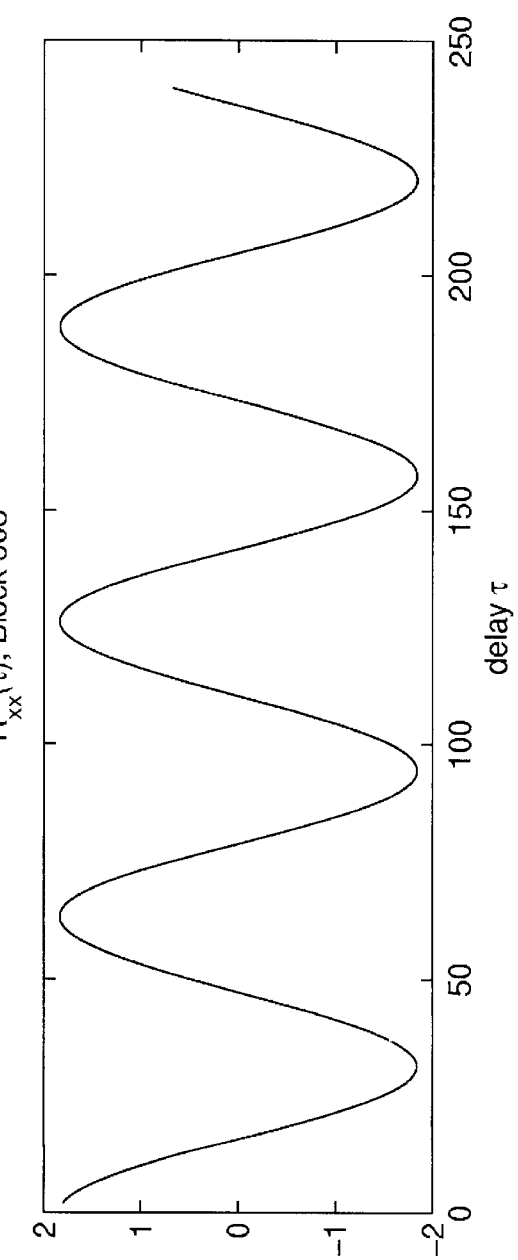

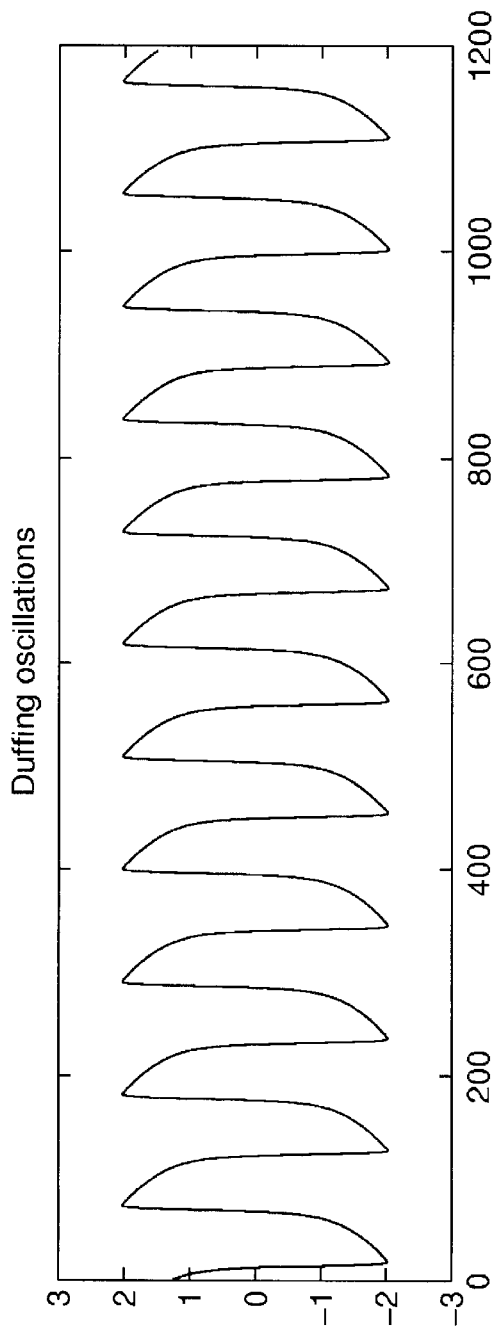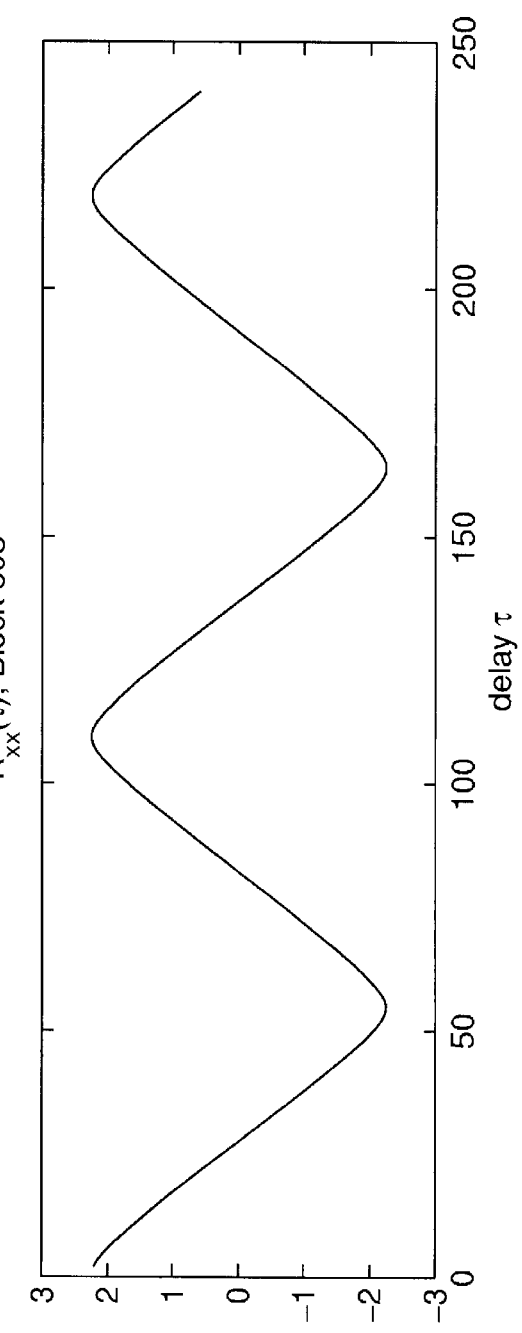

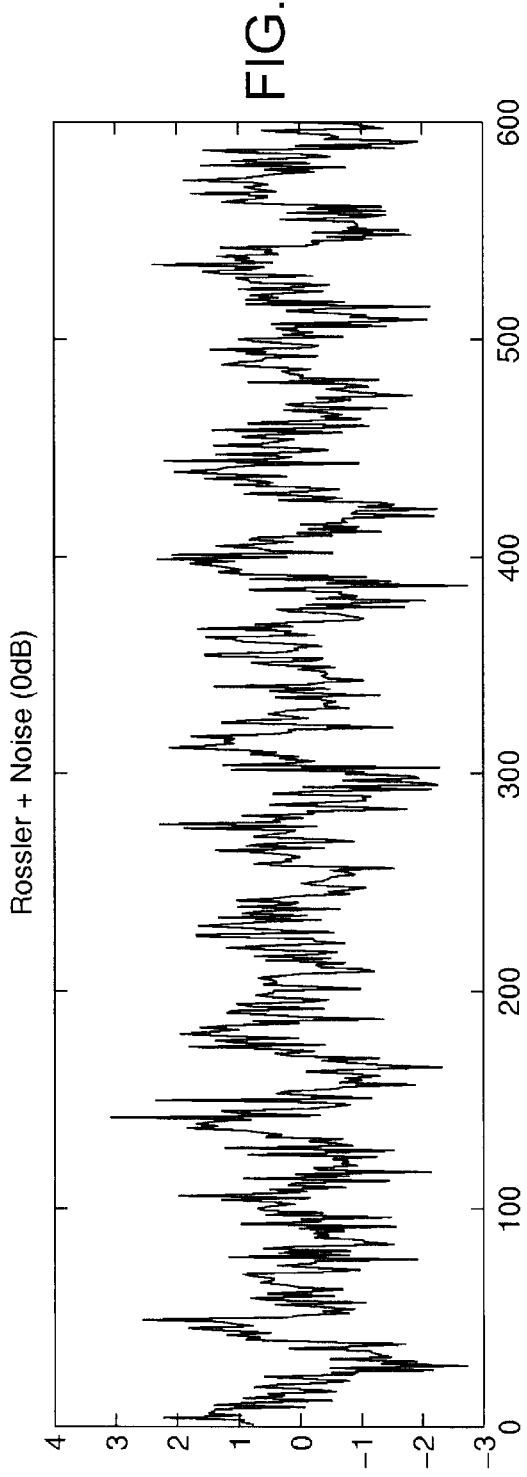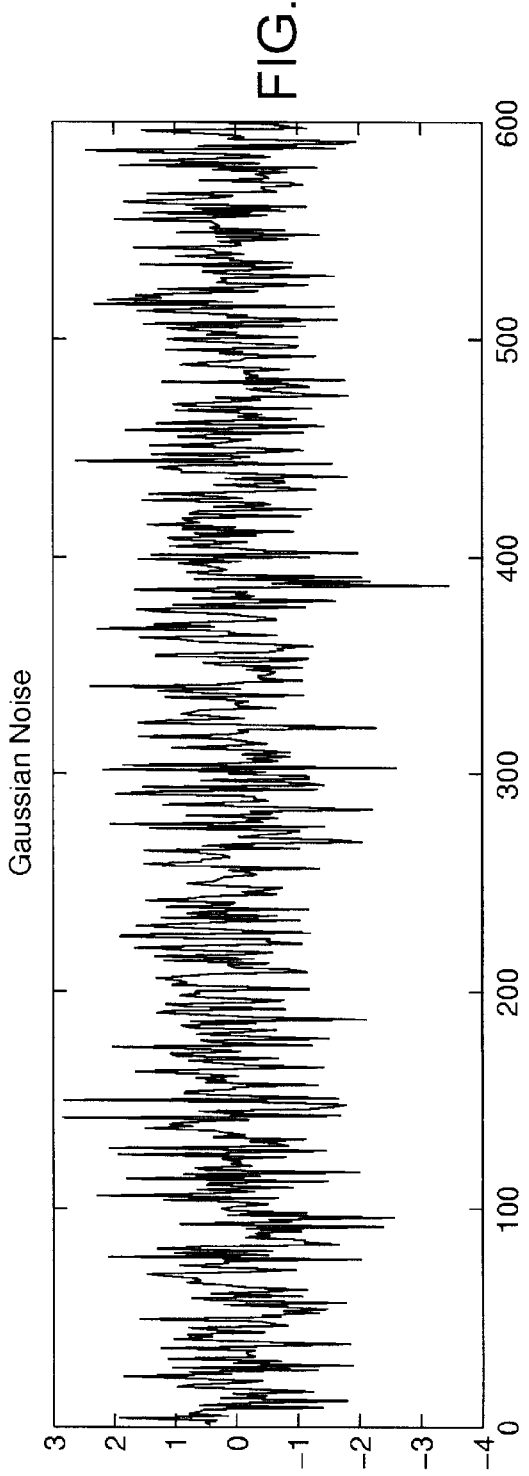
FIG. 7A
FIG. 7B

DETECTION AND CLASSIFICATION SYSTEM FOR ANALYZING DETERMINISTIC PROPERTIES OF DATA USING CORRELATION PARAMETERS

CROSS-REFERENCES TO RELATED APPLICATIONS

This application claims priority under 35 U.S.C. §119(e)(1) and 37 C.F.R. §1.78(a)(4) to U.S. provisional application serial No. 60/051,579 filed Jul. 2, 1997 and titled SIGNAL AND PATTERN DETECTION OR CLASSIFICATION BY ESTIMATION OF CONTINUOUS DYNAMICAL MODELS; and claims priority under 35 U.S.C. §120 and 37 C.F.R. §1.78(a)(2) to U.S. patent application Ser. No. 09/105,529 filed Jun. 26, 1998 and titled SIGNAL AND PATTERN DETECTION OR CLASSIFICATION BY ESTIMATION OF CONTINUOUS DYNAMICAL MODELS.

The U.S. Government has a paid-up license in this invention and the right in limited circumstances to require the patent owner to license others on reasonable terms as provided for by the terms of contract No. N00421-97-C-1048 awarded by the United States Navy.

FIELD OF THE INVENTION

The present invention relates to signal and pattern data detection and classification and, more particularly to data detection and classification using estimated nonlinear correlation parameters and dynamical correlation parameters that reflect possible deterministic properties of the observed data.

BACKGROUND OF THE INVENTION

Existing signal data detection and classification techniques generally use linear models derived from an integro-differential operator such as an ordinary differential equation or a partial differential equation. A set of model parameters are estimated using an optimization technique that minimizes a cost function, e.g. the least squares optimization technique. The model parameters can be used to replicate the signal and classification is applied to the replicated model.

Such signal data detection and classification techniques based on integro-differential operators are computationally intensive and have difficulty in environments having high levels of background noise or interfering signals. Existing techniques also typically fail to take advantage of physical information possibly derived from a signal generating system.

Accordingly, there exists a need for signal and pattern data detection and classification techniques that are computationally efficient and that can provide performance in environments subject to relatively high levels of background noise or interfering signals. The present invention satisfies these needs.

SUMMARY OF THE INVENTION

The present invention is a data detection and classification system for revealing aspects of information or observed data signals that reflect deterministic properties of the data signals. The deterministic properties of an observed data signal may be efficiently estimated, according to the invention, using correlation parameters based on nonlinear dynamical principles. The system is particularly advantageous for detecting and classifying observed data signals provided by complicated nonlinear dynamical systems and processes, which data signals may be spectrally broadband and very difficult to detect using standard signal processing and transform techniques.

The invention is embodied in a method, and related apparatus, for detecting and classifying signals in which a data signal is acquired from a dynamical system, normalized, and used to calculate at least one of a nonlinear or dynamical correlation coefficient. The correlation coefficient may result from a correlation between the normalized data signal and a derivative of the normalized data signal, or from a correlation between the normalized data signal and an exponent of the normalized signal wherein the exponent may be an integer of 2 or greater. Further, the data signal may be normalized to zero mean and unit variance.

Alternatively, the invention may be embodied in an apparatus, and related method, for processing an input signal wherein the apparatus has a first differentiator, a delay circuit and a first correlator. The first differentiator receives the input signal and generates a first derivative signal which is based on a derivative of the input signal. The delay circuit delays the input signal by a predetermined time period to generate a delayed signal and the first correlator correlates the delayed signal with the first derivative signal to generate a first correlated signal. The apparatus may further or alternatively include a first function generator and a second correlator. The first function generator may receive the input signal and generate a first processed signal based on a first predetermined function and the second correlator correlates the delayed signal with the first processed signal to generate a second correlated signal. Alternatively, the first function generator may generate the first processed signal using the first derivative signal. Further, the first predetermined function may be a square of the input signal received by the first function generator. Also, the correlated signals may be further processed to detect deterministic properties in the input signal.

The invention may be also embodied in a method, and related apparatus, for processing an analog input signal in which the analog input signal is digitized to generate a digital input signal and then normalized to a normalized digital signal. Next, correlation signals are calculated based on the normalized signal to generate a correlation matrix and a derivative of the correlation matrix is calculated to generate a derivative correlation coefficient matrix. Estimating coefficients are then calculated based on the correlation matrix and the derivative correlation coefficient matrix.

Other features and advantages of the present invention should be apparent from the following description of the preferred embodiments, taken in conjunction with the accompanying drawings, which illustrate, by way of example, the principles of the invention.

BRIEF DESCRIPTION OF THE DRAWINGS

FIG. 2A is a graph of an input signal versus time, generated by an autonomous Van Der Pol oscillator having $\mu=0.2$ (linear regime), that is representative of observed data input into the analog signal processor of FIG. 1.

FIG. 2B is a graph of a correlation parameter versus time delay $\tau$, generated by an auto-correlator (block 164) of FIG. 1, based on the input signal of FIG. 2A.

FIG. 2C is a graph of an input signal versus, generated by an autonomous Van Der Pol oscillator having $\mu=4.0$ (nonlinear regime), that is representative of observed data input into the analog signal processor of FIG. 1.

FIG. 2D is a graph of a correlation parameter versus time delay τ, generated by an auto-correlator (block 164) of FIG. 1, based on the input signal of FIG. 2C.

FIG. 7A is a graph of an deterministic signal generated by a Rossler model in 0 dB Gaussian noise.

FIG. 7B is a graph a signal segment of pure Gaussian noise.

DETAILED DESCRIPTION OF THE PREFERRED EMBODIMENTS

As shown in the exemplary drawings, the present invention is embodied in a signal processing apparatus, and related method, for detecting and classifying aspects of dynamical information or observed data signals that reflect deterministic properties of the data signals using an efficient estimation technique for determining correlation parameters based on nonlinear dynamical principles. The signal processing apparatus implements a technique that is capable of detecting and classifying very general structure in the observed data. The technique is particularly advantageous for detecting and classifying observed data derived from complicated chaotic or nonlinear time evolution which may be spectrally broadband and very difficult to detect using any standard signal processing and transform methods.

The estimation technique may be applied to a wide variety of observed data for detailed characterization of transient (non-stationary) air or underwater signals, including acoustic signal classification for multi-class target recognition. Further, the correlation parameters may be selected to reveal deterministic properties based on nonlinear dynamical principles, or the correlation parameters may be based on heuristically selected nonlinear dynamical models represented by delayed and/or coupled differential equations.

The theoretical derivation of the correlation parameters and representative design methodologies for applying the derived correlation parameters are presented in Appendix A. More specifically, several generally applicable techniques for estimating the correlation parameters are presented and then, based on practical considerations, the estimation techniques are generally applied to provide general architectures for signal processing. The following embodiments of signal processing apparatus of the invention are derived from the general architectures theoretically developed in Appendix A.

Figure 1:
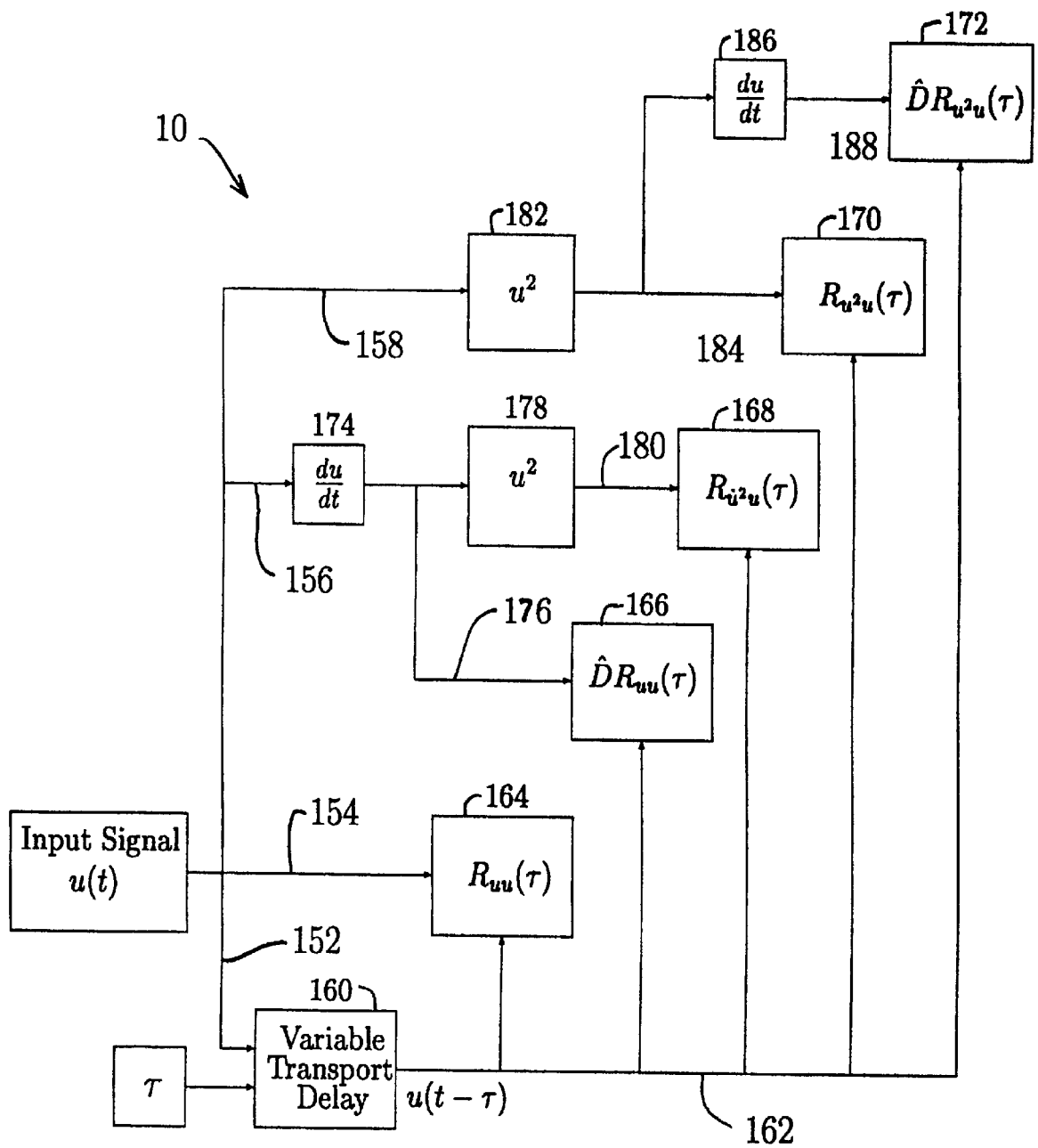
FIG. 1 is a block diagram of an analog signal processor for detecting and classifying deterministic properties of observed data using correlation parameters, according to the present invention.
Figure 3A:
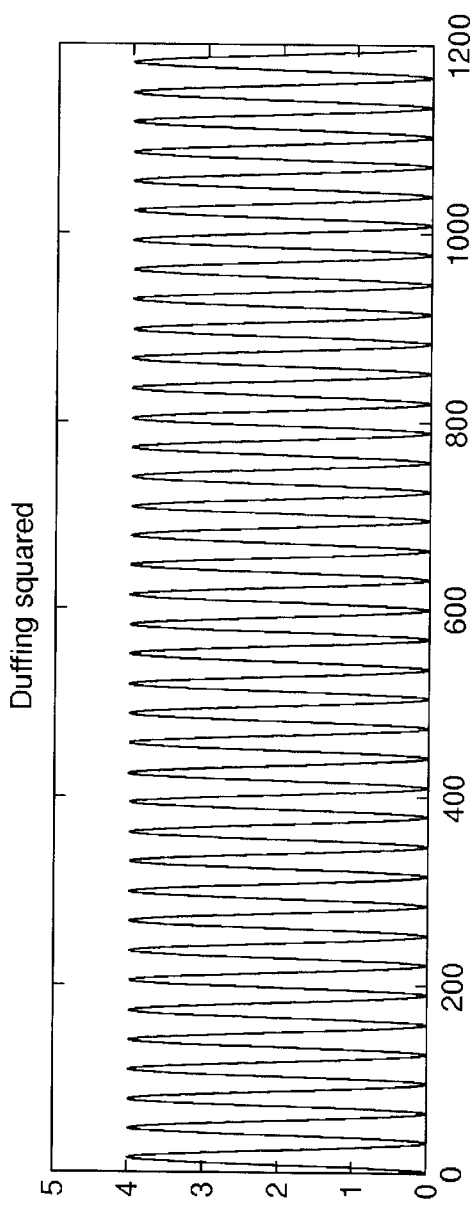
FIG. 3A is a graph of an output signal representing the square of the input signal of FIG. 2A generated by a squaring device (block 182) of FIG. 1.
Figure 3B:
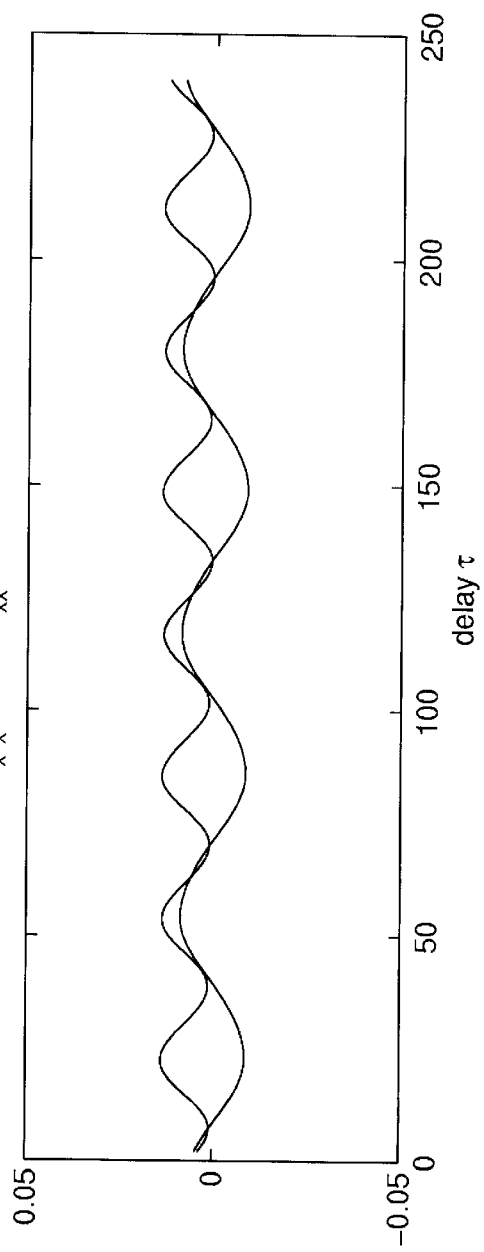
FIG. 3B is a graph of a correlation parameter generated by a correlator (block 170) of FIG. 1, based on the input signal of FIG. 2A and the squared signal of FIG. 3A.
Figure 3C:
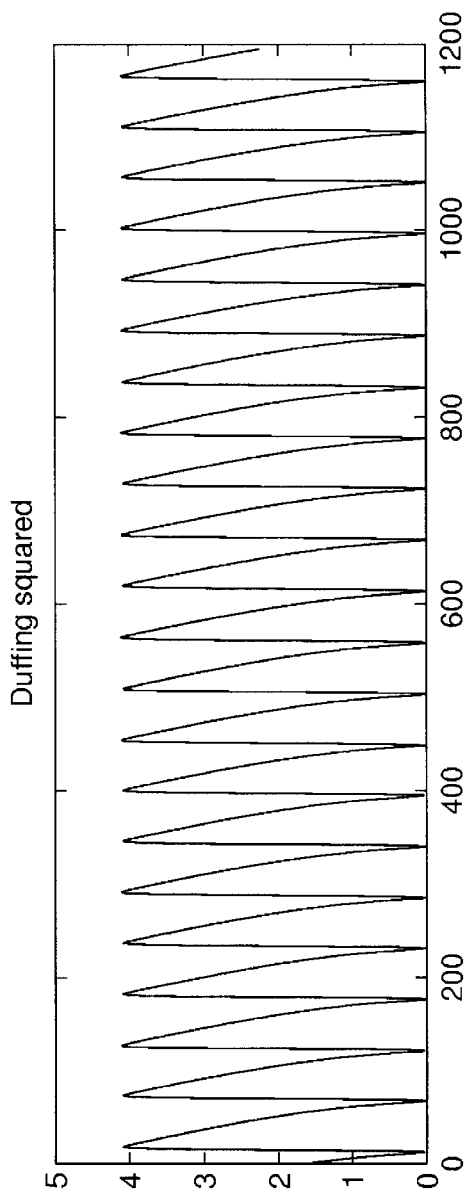
FIG. 3C is a graph of an output signal representing the square of the input signal of FIG. 2C generated by a squaring device (block 182) of FIG. 1.
Figure 3D:
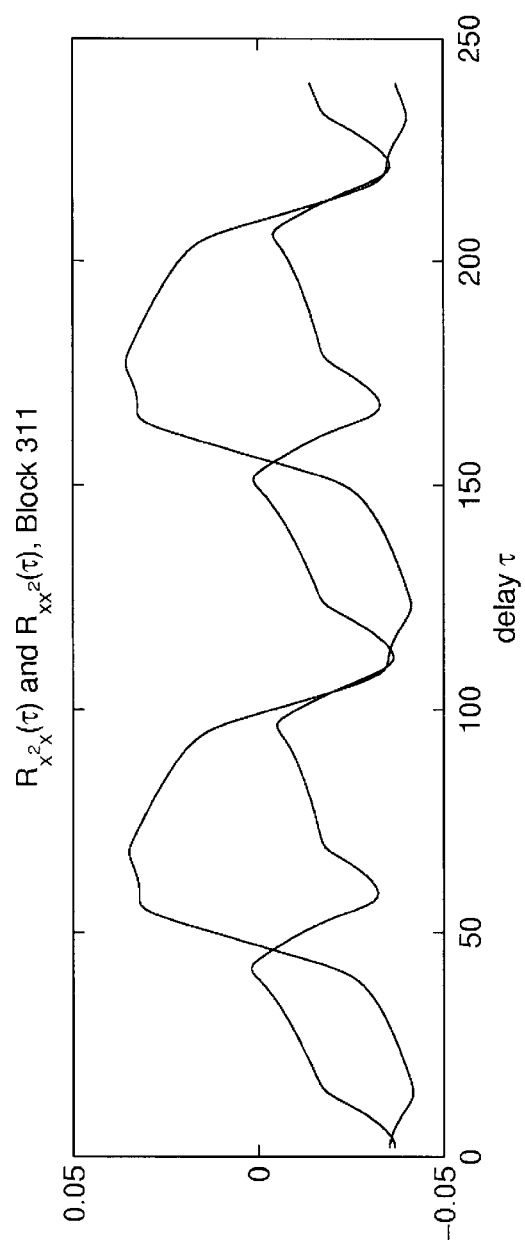
FIG. 3D is a graph of a correlation parameter generated by a correlator (block 170) of FIG. 1, based on the input signal of FIG. 2C and the squared signal of FIG. 3C.
Figure 4A:
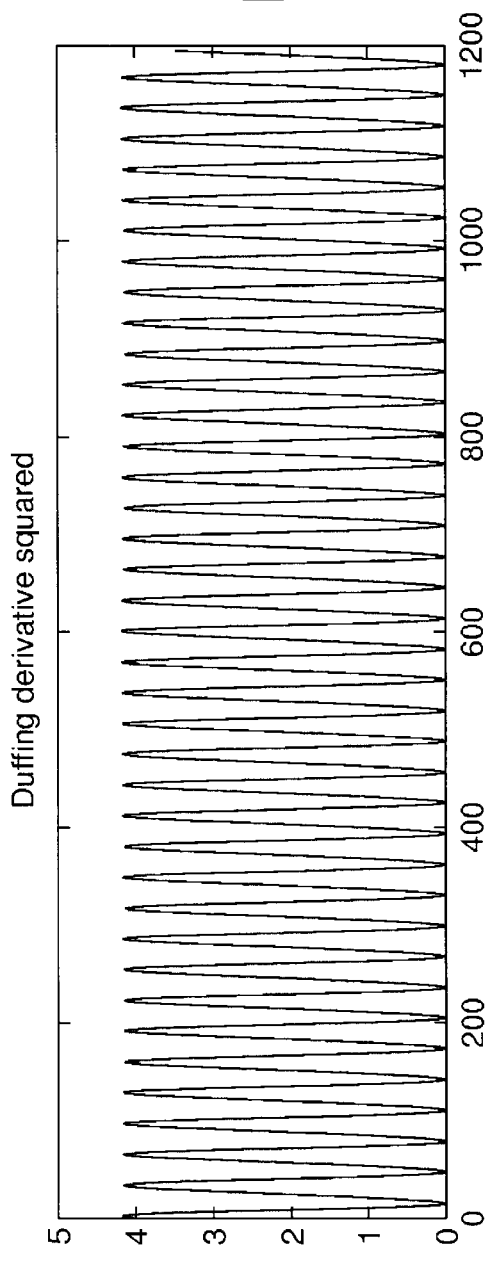
FIG. 4A is a graph of an output signal representing the square of the derivative of input signal of FIG. 2A generated by a derivative device (block 174) and a squaring device (block 178) of FIG. 1.
Figure 4B:
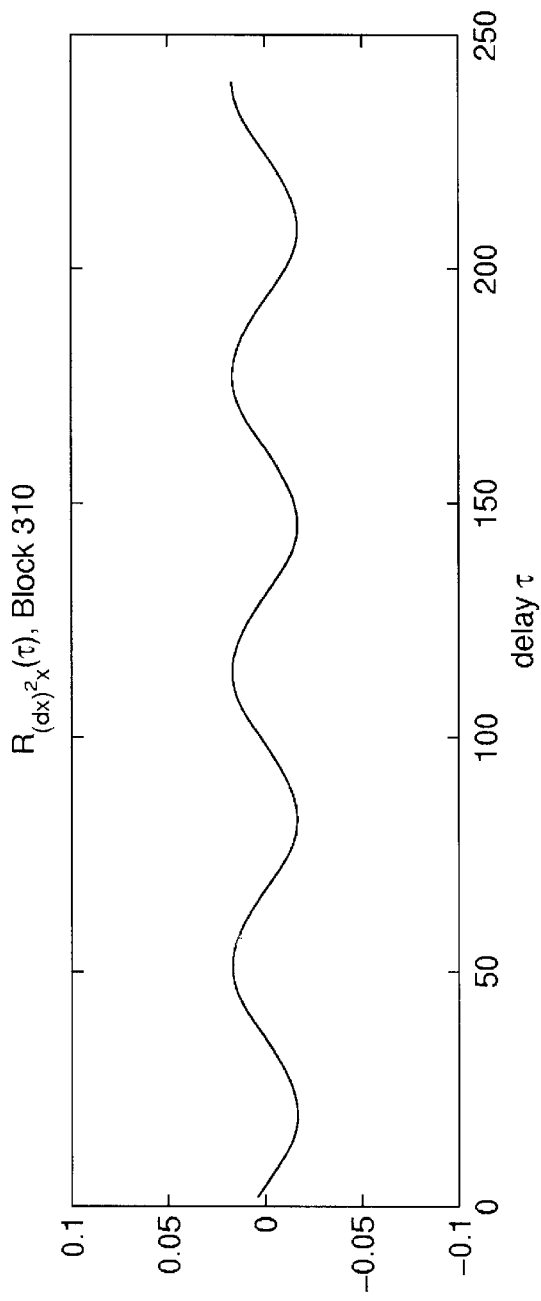
FIG. 4B is a graph of a correlation parameter generated by a correlator (block 168) of FIG. 1, based on the input signal of FIG. 2A and the squared derivative signal of FIG. 4A.
Figure 4C:
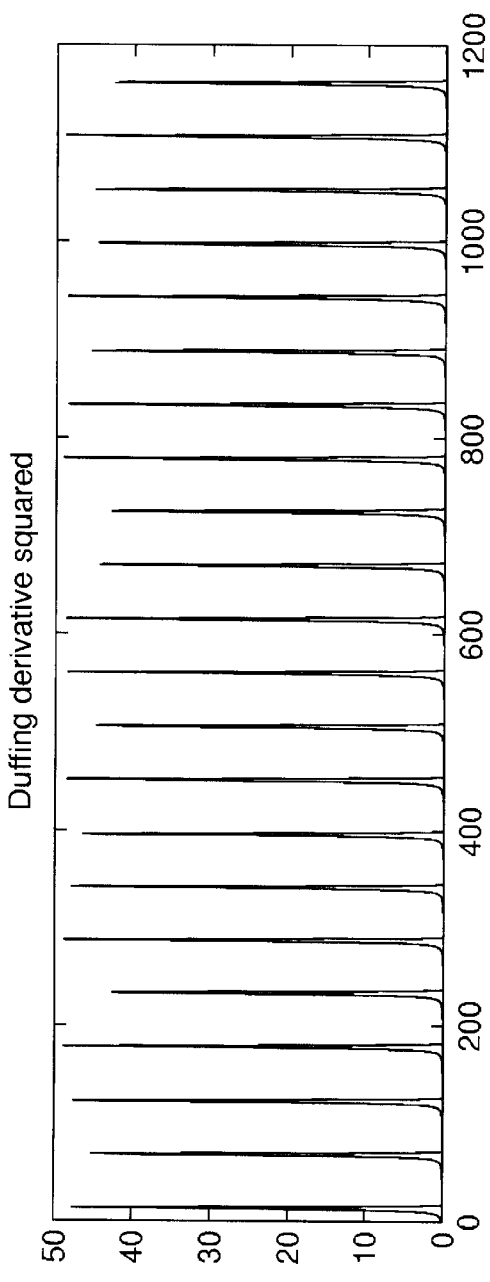
FIG. 4C is a graph of an output signal representing the square of the derivative of input signal of FIG. 2C generated by a derivative device (block 168) and a squaring device (block 178) of FIG. 1.
Figure 4D:
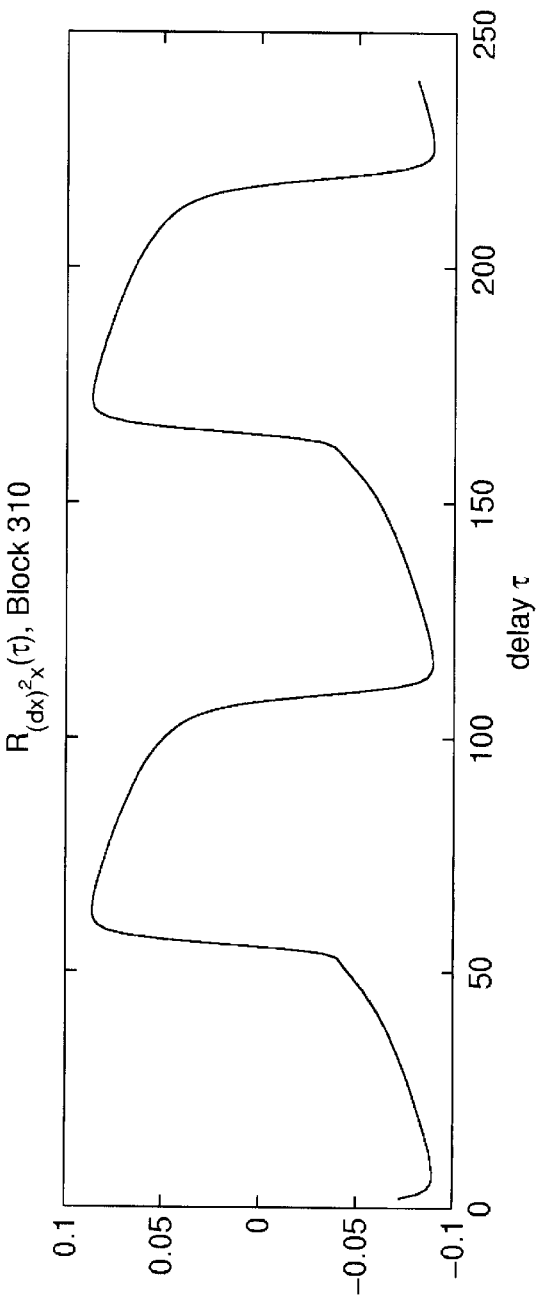
FIG. 4D is a graph of a correlation parameter generated by a correlator (block 168) of FIG. 1, based on the input signal of FIG. 2A and the squared derivative signal of FIG. 4C.

The signal processing apparatus of the invention may be embodied in an analog circuit device 10, shown in FIG. 1, for providing general deterministic signal discrimination of general scalar input signals based on a delay-differential signal model up to a quadratic order. The analog circuit device is based on the architecture of Section 2.1 of Appendix A, with the function transformation f(u) being set to $u^2$. The analog circuit device 10 estimates observed data feature correlations using a circuit of operational amplifiers and correlators. The analog circuit device provides high computational speed and efficiency. Visual inspection of the resulting correlation parameters also provides high speed classification by a human operator, or alternately, simple statistical tests may be used on the resulting correlation parameters to provide simple feature comparisons. An example input signal u(t) is provided to the analog circuit device using autonomous Van Der Pol circuit oscillations.

The analog circuit device 10 receives the input signal u(t) and provides it to a plurality of signal processing paths 152, 154, 156 and 158. In a first path 152, the input signal is delayed by a predetermined time period τ (tau) by a variable transport delay 160 to generate a delayed input signal u(t–τ). The variable transport delay may be implemented using a Digitally Programmable Delay Generator (Part No.: AD9500) available from Analog Devices, Inc. of Norwood, Mass. The delayed input signal u(t–τ) is provided by a signal path 162 to a series of correlators 164, 166, 168, 170 and 172 for correlation with the input signal or with processed forms of the input signal. The correlators each may be implemented using a CMOS Digital Output Correlator (Part No.: TMC2023) available from Fairchild Semiconductor, Inc. of South Portland, Me.

The first correlator 164 is provided with the input signal u(t) from the second signal processing path 154 and with the delayed input signal u(t–τ) and generates a first correlation parameter signal based on a correlation of the input signals. The first correlation parameter signal is an autocorrelation of the input signal u(t) and is designated $R_{uu}(\tau)$ and corresponds to the correlation parameter of Appendix A Eqn. 27.

A third signal path 156 is coupled to a derivative device 174 that generates from the input signal u(t) a derivative signal du/dt on a signal path 176. The derivative device is implemented using an operational amplifier (not shown) configured with resistor and capacitor elements as known in the art. The second correlator 116 receives the derivative signal du/dt and the delayed input signal u(t–τ) and generates a second correlation parameter signal which is designated $D^{\hat{}}R_{uu}(\tau)$ and which corresponds to the correlation parameter of Appendix A Eqn. 28.

The derivative signal du/dt is also provided to a squaring device 128 which generates a squared derivative signal $(du/dt)^2$ on a signal path 180. The third correlator 168 receives the squared derivative signal $(du/dt)^2$ and the delayed input signal u(t–τ) and generates a third correlation parameter signal which is designated $R_{u(dot)}{}^2{}_u(\tau)$ and which corresponds to the correlation parameter of Appendix A Eqn. 30.

The fourth signal path 158 is coupled to a squaring device 182 which generates a squared signal $u^2$ on a signal line 184. The fourth correlator 170 receives the squared signal from the squaring device and receives the delayed input signal u(t–τ) and generates a fourth correlation parameter signal which is designated $DR_u{}^2{}_u(\tau)$ and which corresponds to the correlation parameter of Appendix A Eqn. 32. The squared signal is also provided to a derivative device 186 which generates a derivative squared signal on a signal line 188.

The fifth correlator 172 receives the derivative squared signal $d(u^2)/dt$ and the delayed input signal u(t–τ) and generates a fifth correlation parameter signal which is designated $D^{\hat{}}R_u{}^2{}_u(\tau)$ and which corresponds to the correlation parameter of Appendix A Eqn. 34.

A prototype to simulate the operation of the analog circuit device 10 was implemented using the SIMULINK package from the Matlab toolbox. ("Matlab 5", scientific modeling and visualization software provided by The Math-Works Inc., Natick, Mass. 01760, USA, Phone: (508)-647-7001). The input signal u(t) was generated using the autonomous Van Der Pol oscillator based on the following equation (where x=u(t)):

$$\ddot{x} - \mu(1-x^2)\dot{x} + \omega_0^2 x = 0 \quad\quad \text{Eqn. 1.}$$

The parameter μ represents the nonlinear dissipation in the input signal. In the limit case of μ=0, the input signal evolves as a simple harmonic oscillator (FIG. 2A). For μ=4.0, the input signal is still periodic, but is significantly nonlinear (FIG. 2C).

The response of the analog circuit device 10 is demonstrated by the graphs shown in FIGS. 2–4. As discussed above, a graph of the amplitude of a simple harmonic oscillation signal, versus time delay 96, generated by the autonomous Van Der Pol oscillator, is shown in FIG. 2A. Shown in FIG. 3A is the square of the simple harmonic signal of FIG. 2A, versus time delay τ, generated by the squaring device (block 182). Shown in FIG. 4A is the derivative squared of the simple harmonic signal of FIG. 2A, versus time delay τ, generated by the derivative device (block 186). As discussed above, a graph of an oscillation signal exhibiting nonlinear properties, versus time τ, is shown in FIG. 2C. Shown in FIG. 3C is the squared nonlinear signal of FIG. 2C, versus time delay τ, generated by the squaring device (block 132). Shown in FIG. 4C is the derivative squared nonlinear signal of FIG. 2A, versus time delay τ, generated by the derivative device (block 186). In the linear regime (FIGS. 2A, 3A and 4A) the values of the correlations (FIGS. 2B, 3B and 4B) are very harmonic or sinusoidal and the values of the nonlinear correlations (FIGS. 3B and 4B) tend to be small, while in the nonlinear regime (FIGS. 2C, 3C and 4C) the values of the correlations (FIGS. 2D, 3D and 4D) have peculiar shapes and the nonlinear correlations are significantly larger.

A blind statistical test leads to the same result as the visual observation of the graphs. A T-test for different means for the correlations, shown in FIGS. 2–4, gives very high significance (I<0.0001) of the differences for each delay time considered separately.

Another embodiment of the invention based on a digital signal processing technique for revealing deterministic properties of observed data signals is shown with respect to FIGS. 5–8. The technique is implemented using a digital signal processor 20 (FIG. 5) that includes an analog-to-digital converter 202, a processor 204, read only memory (ROM) 206, random access memory (RAM) 208, a video driver 210, and a display 212. The digital signal processor may be implemented using a general purpose processor such as, for example, an IBM compatible personal computer using processing software such as Matlab supra. Alternately, the digital signal processor may be a special purpose processor, a gate array or a programmable digital processing unit such as the ADSP-210xx family of development tools provided by Analog Devices, Inc.

Figure 6:
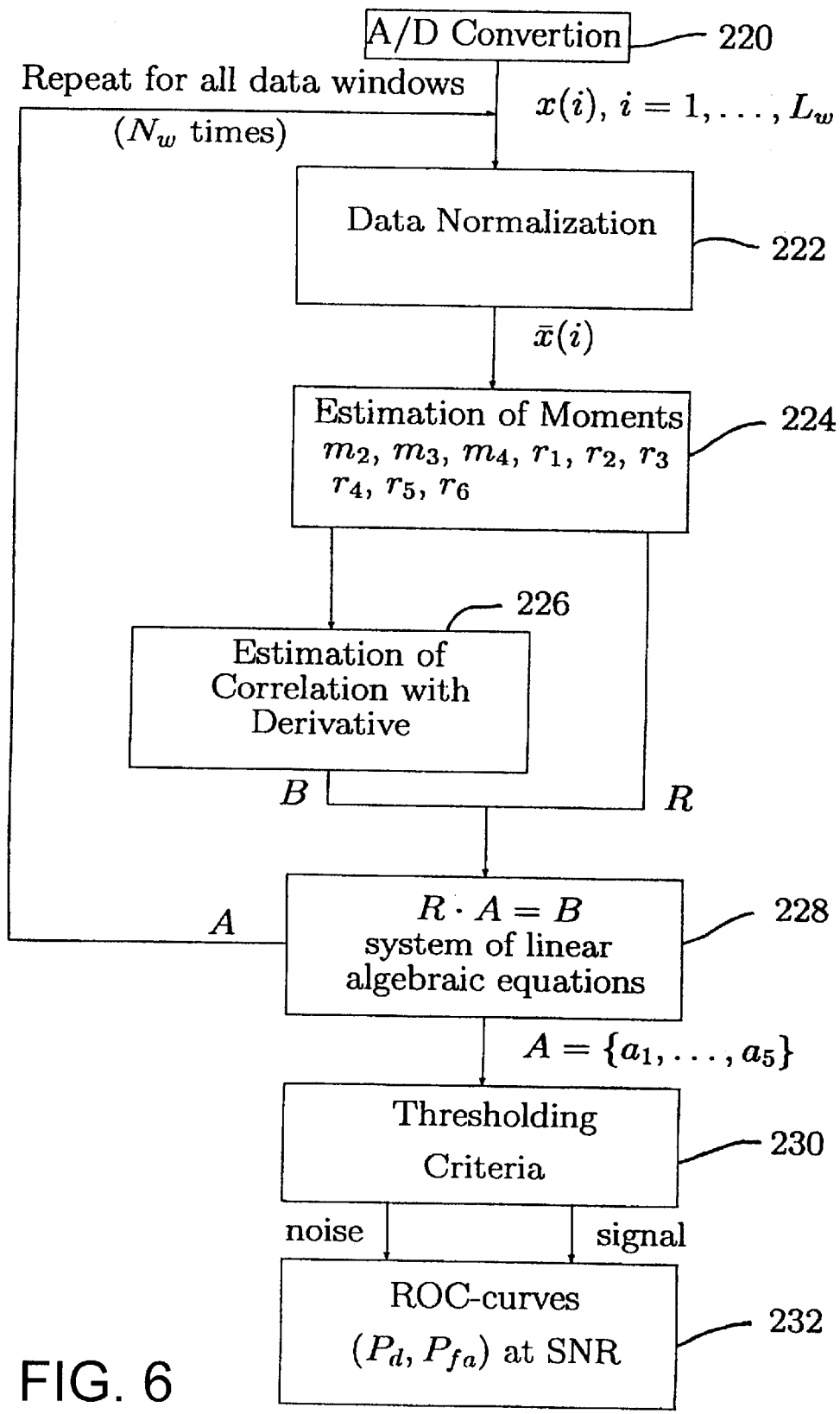
FIG. 6 is a flow chart showing a process for implementing, using the digital processor of FIG. 5, a simple digital detector for detecting determinism and/or nonlinearity, according to the present invention.

An analog signal is digitized by the A/D converter 202 generating a series of data values of length $L_W$ (block 220, FIG. 6). The data values are normalized (block 222) and used to calculated an estimation of moments (block 224). The normalization technique is discussed in more detail in Section 2.2 of Appendix A. The estimates are derived from a dynamical model based on the delayed differential equation of Appendix A Eqn. 9. The moment estimations forms a correlation matrix R of Appendix A Eqn. 23. An estimation of correlations with derivatives is used to estimate a derivative B matrix (block 226) of Appendix A Eqn. 21. The individual derivative correlations are estimated using Appendix A Eqns. 49–51. Next, the set of model coefficient parameters A are calculated (block 228) and the process repeated $N_W$ times for all data windows. The model coefficient parameters are provided to a threshold process (block 230). The threshold process uses existing discrimination techniques such as statistics and averaging to distinguish the deterministic signals from random noise (block 232).

To demonstrate the operation of this technique, a nonlinear data signal is generated using the following Rossler equations:

$$x=-y-z$$

$$y=x+0.2y$$

$$z=0.5+xz-14z,$$

which describe a 3-component chemical reaction [Rossler, O. E. "An equation for continuous chaos", Physics Letters A 57A(5), p.397–8 (1976)]. The equations are integrated and the result sampled with $\Delta t=0.15$. The x-component of the Rossler signal is corrupted by the addition of a significant amount of Gaussian noise, shown in FIG. 7A, generated by the Matlab random function. A signal representing only Gaussian noise is shown in FIG. 7B.

Figure 8A:
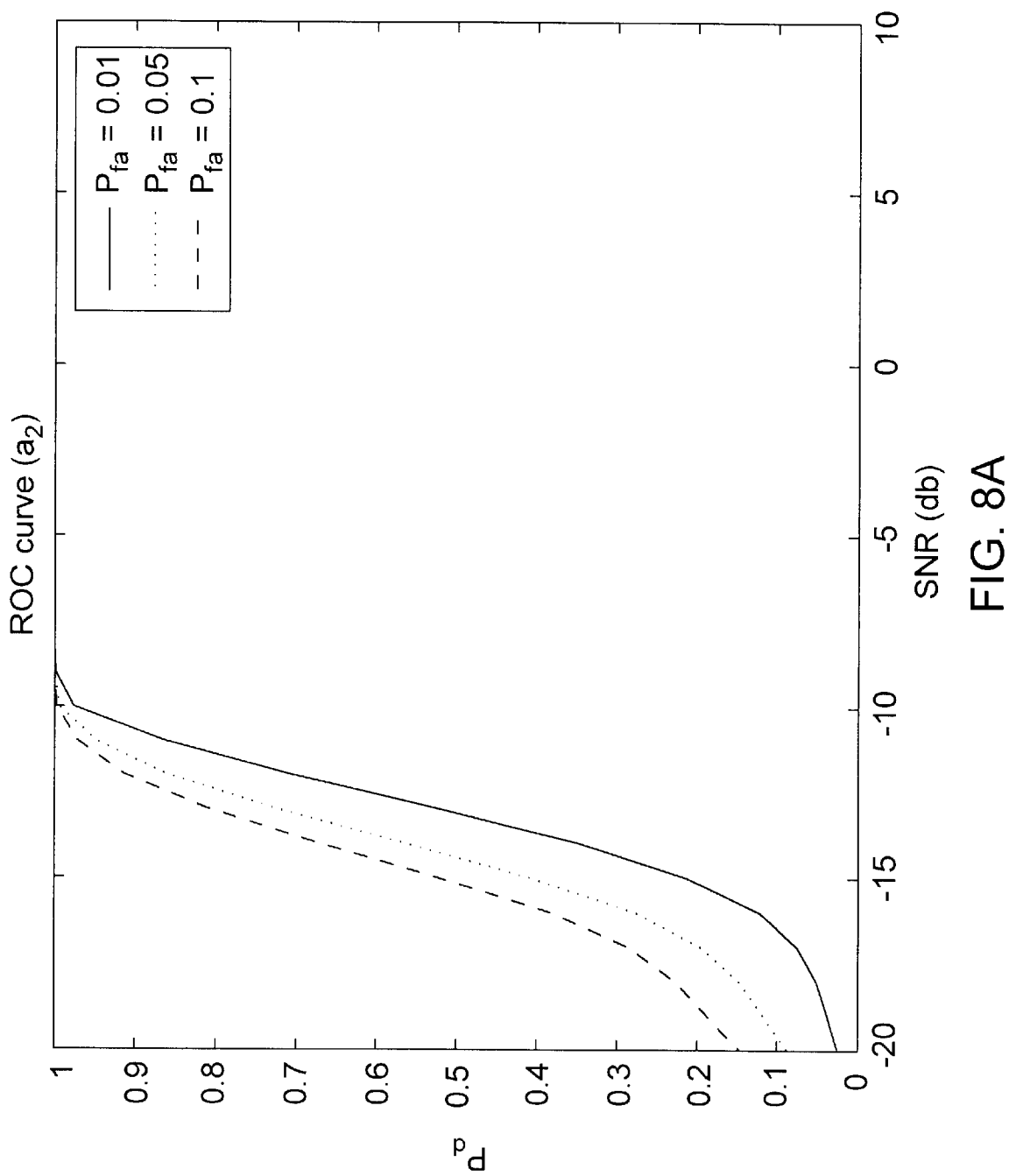
FIGS. 8A is a graph of probability of detection for a linear model coefficient $a_2$ versus noise level in decibels for three levels of probability of false alarm.
Figure 8B:
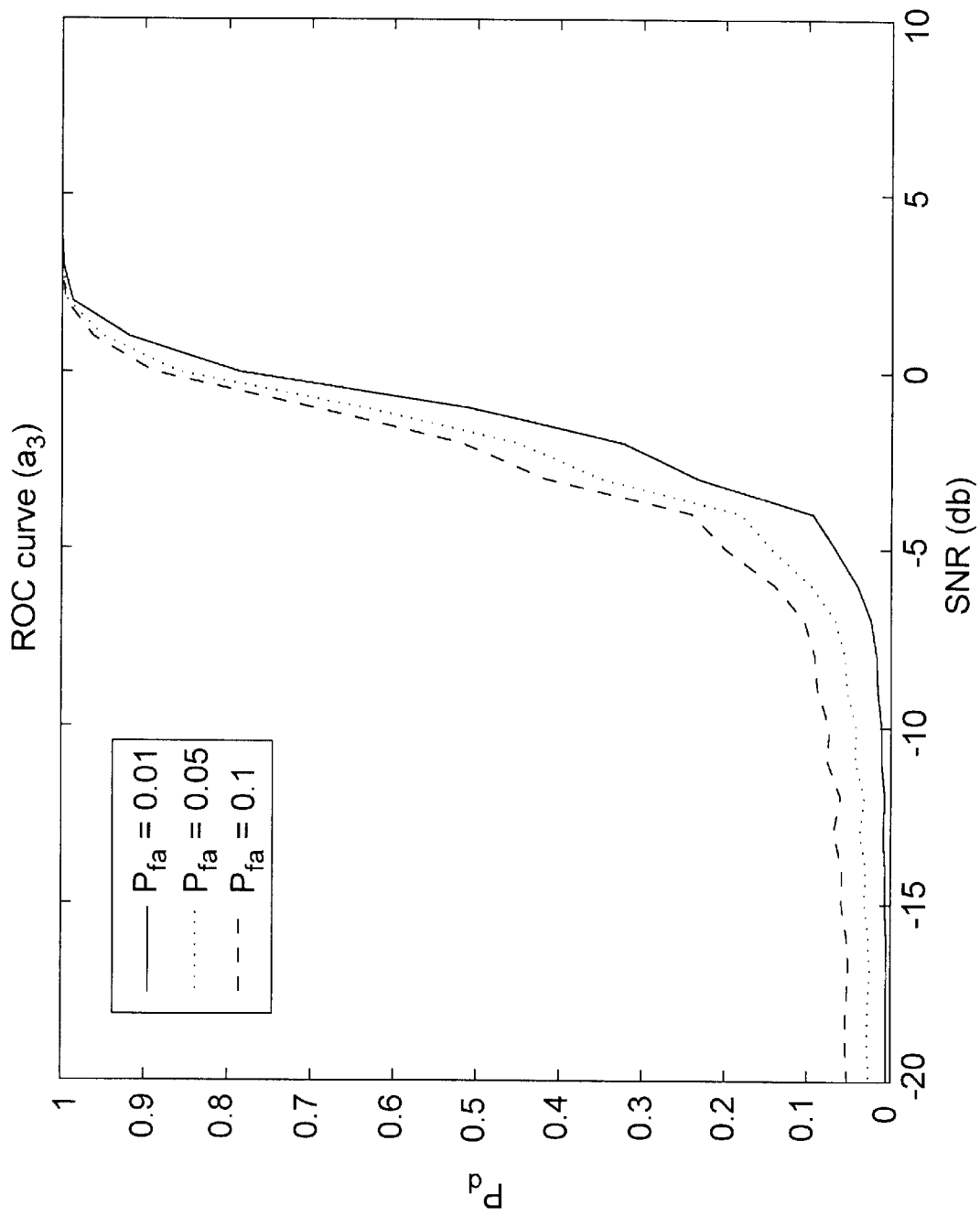
FIGS. 8B is a graph of probability of detection for a nonlinear model coefficient $a_3$ versus noise level in decibels for three levels of probability of false alarm.

The output "receiver operating characteristics" (ROC) curves are shown in FIG. 8 for $P_{fa}$=0.01, 0.05, 0.1. Note that $a_2$ is a linear coefficient of Appendix A Eqn. 9, whereas $a_3$ is a nonlinear coefficient. The coefficient $a_2$ may be used to detect determinism for very low SNR and coefficient $a_3$ is useful to detect nonlinearity for higher SNR. For example, if $P_{fa}$ is restricted to less than 0.05 GM (5%), determinism can be detected with a probability almost 1, if $a_2$>15, while the same conditions provide a probability of detection 0.84, if nonlinear coefficient $a_3$ >0.7. Further, the threshold values for coefficients $a_2$ and $a_3$ used to generate ROC curves of FIGS. 8A and 8B are shown in Table 1 (below) for 0 dB noise and different pairs of probability of detection $P_d$ and probability of false alarm $P_{fa}$. The parameters are 900 windows of Lw=800 points of the x-component of the Rossler equations, dt=0.155, τ10 and d=5.

TABLE 1

|  | $P_{fa}$ = 0.01 | $P_{fa}$ = 0.05 | $P_{fa}$ = 0.1 |
| --- | --- | --- | --- |
| $a_2(P_d \approx 1)$ | $a_2$ = 14.62 | $a_2$ = 15.00 | $a_2$ = 15.19 |
| $a_3$ | $a_3$ = 0.50 | $a_3$ = 0.70 | $a_3$ = 0.80 |
|  | ($P_d$ = 0.75) | ($P_d$ = 0.84) | ($P_d$ = 0.87) |

Figure 5:
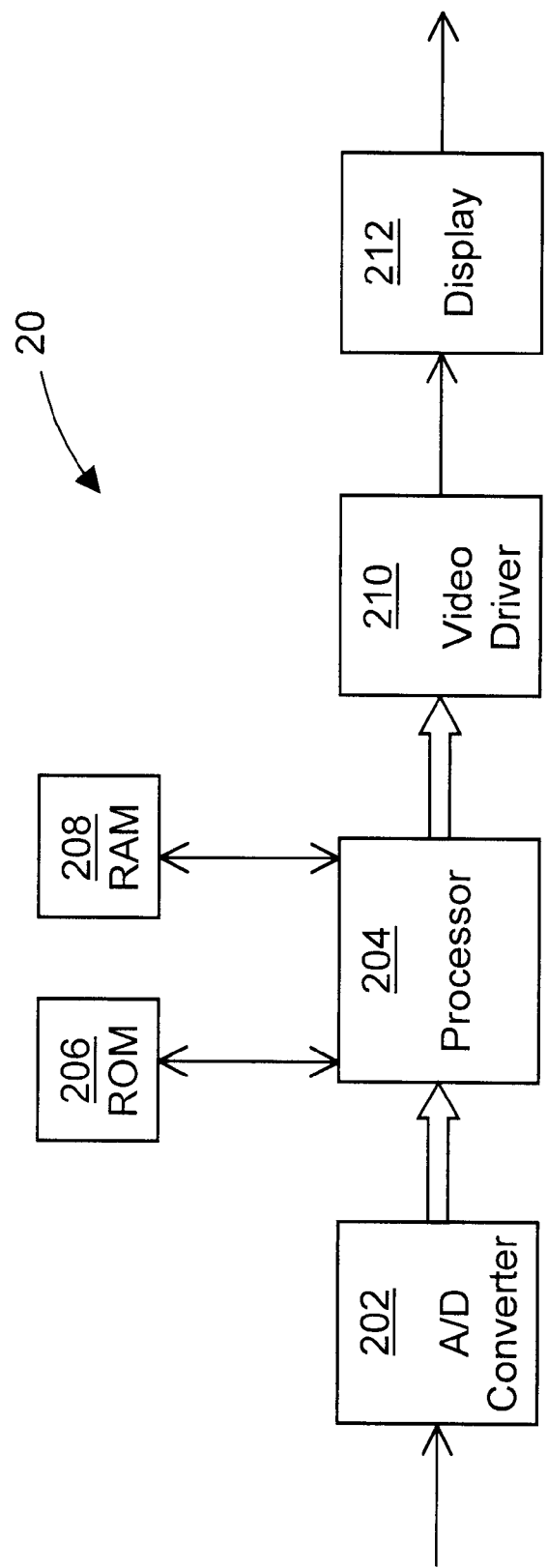
FIG. 5 is a block diagram of a digital signal processor for detecting and classifying deterministic properties of observed data using correlation parameters that are based on nonlinear dynamical principles, according to the present invention.
Figure 9:
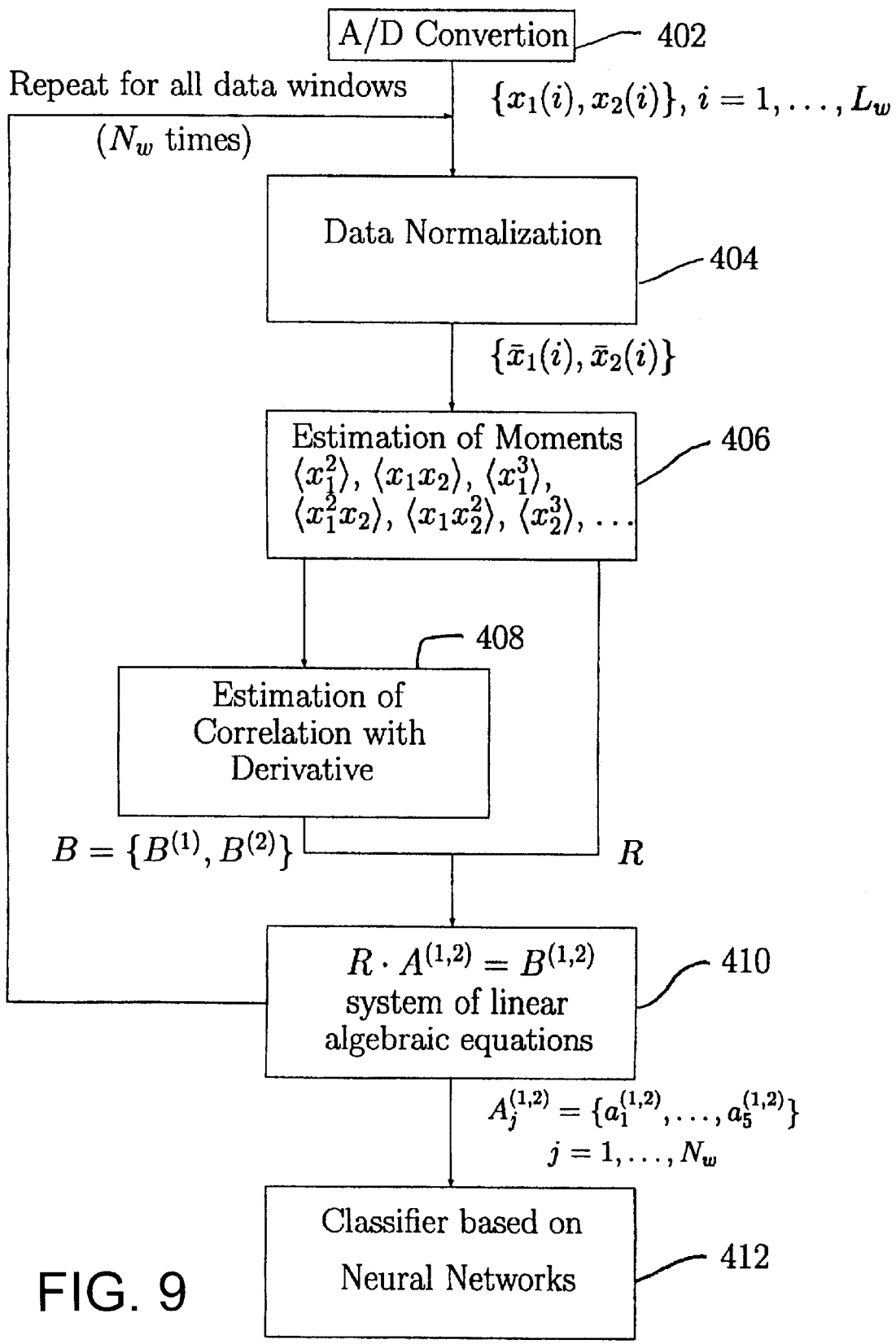
FIG. 9 is a flow chart showing a process for implementing an acoustic signal classifier for multi-class target recognition, using the digital processor of FIG. 5, according to the present invention.
Figure 10A:
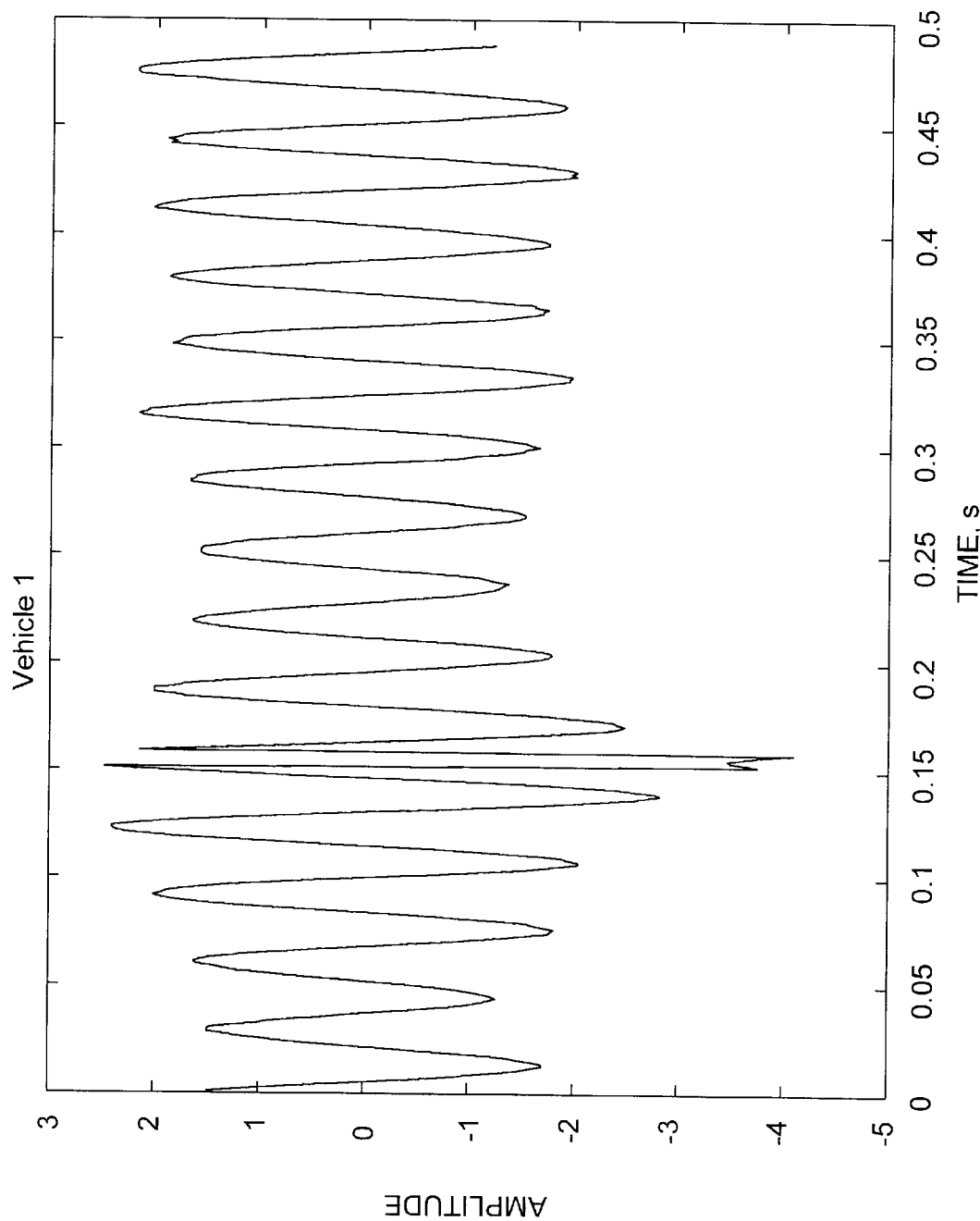
FIGS. 10A–F are graphs of acoustic amplitude, versus time, of six differing mobile land vehicles, respectively, approaching a closet point of approach from left at a speed of 15 miles per hour.
Figure 10B:
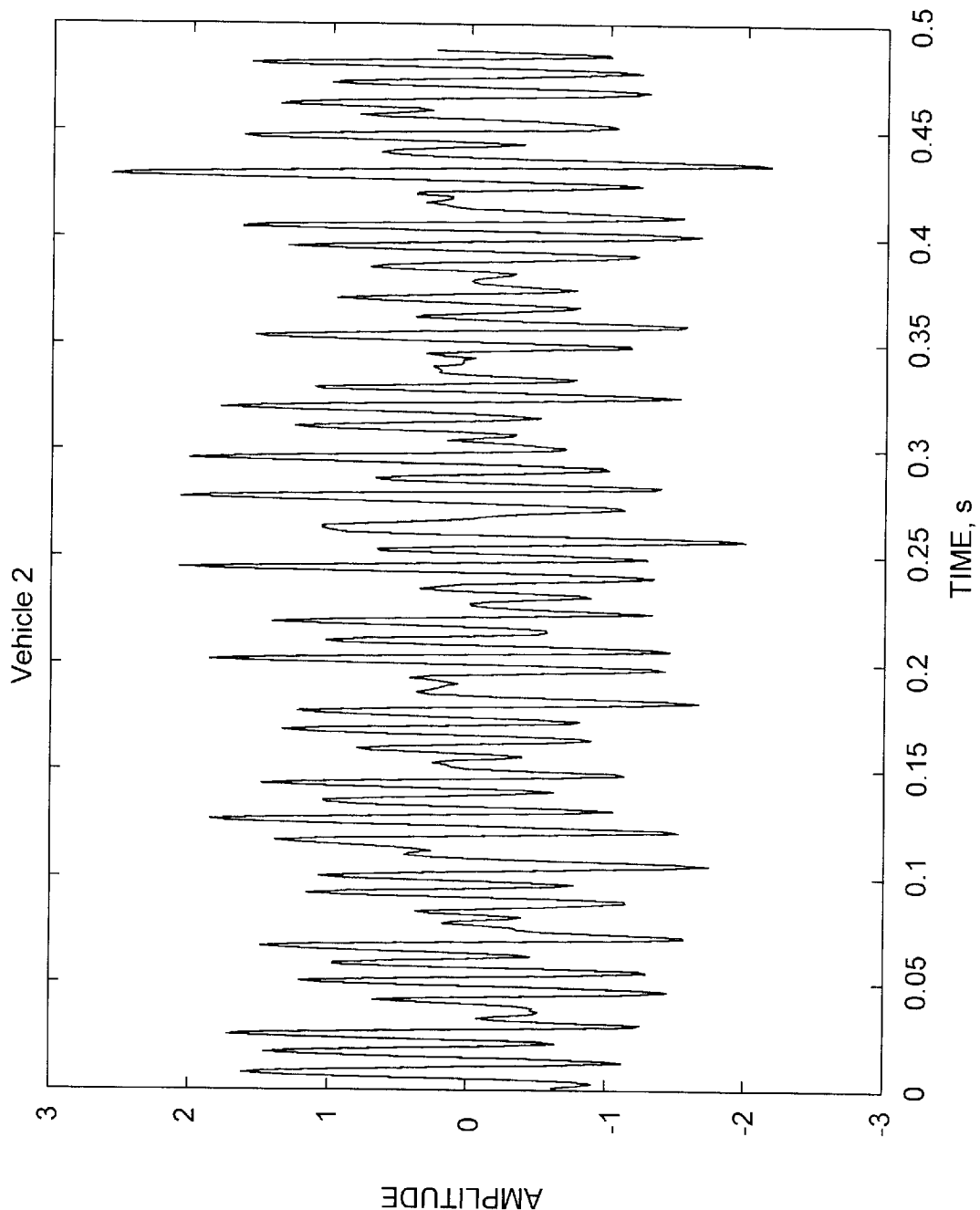
Figure 10C:
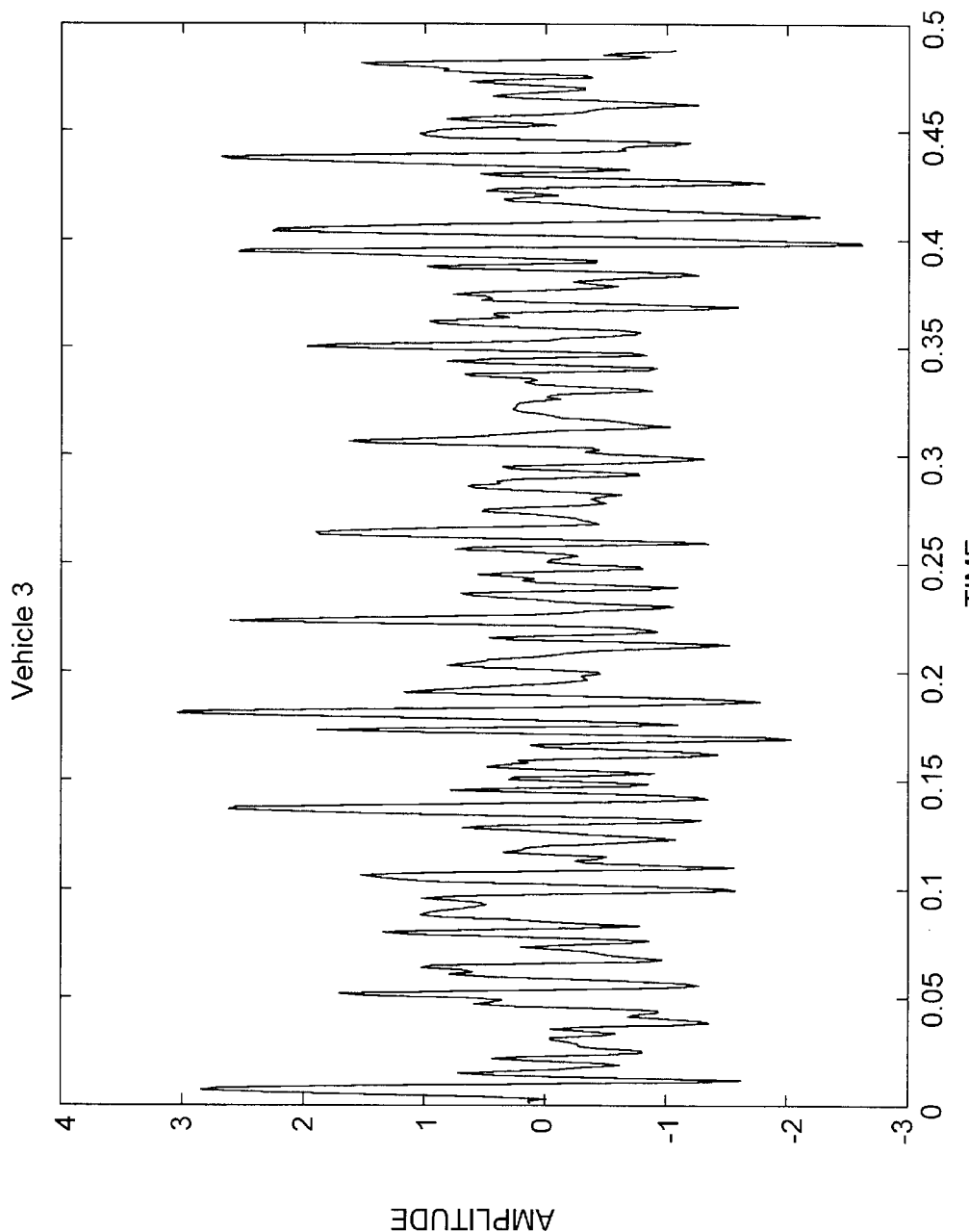
Figure 10D:
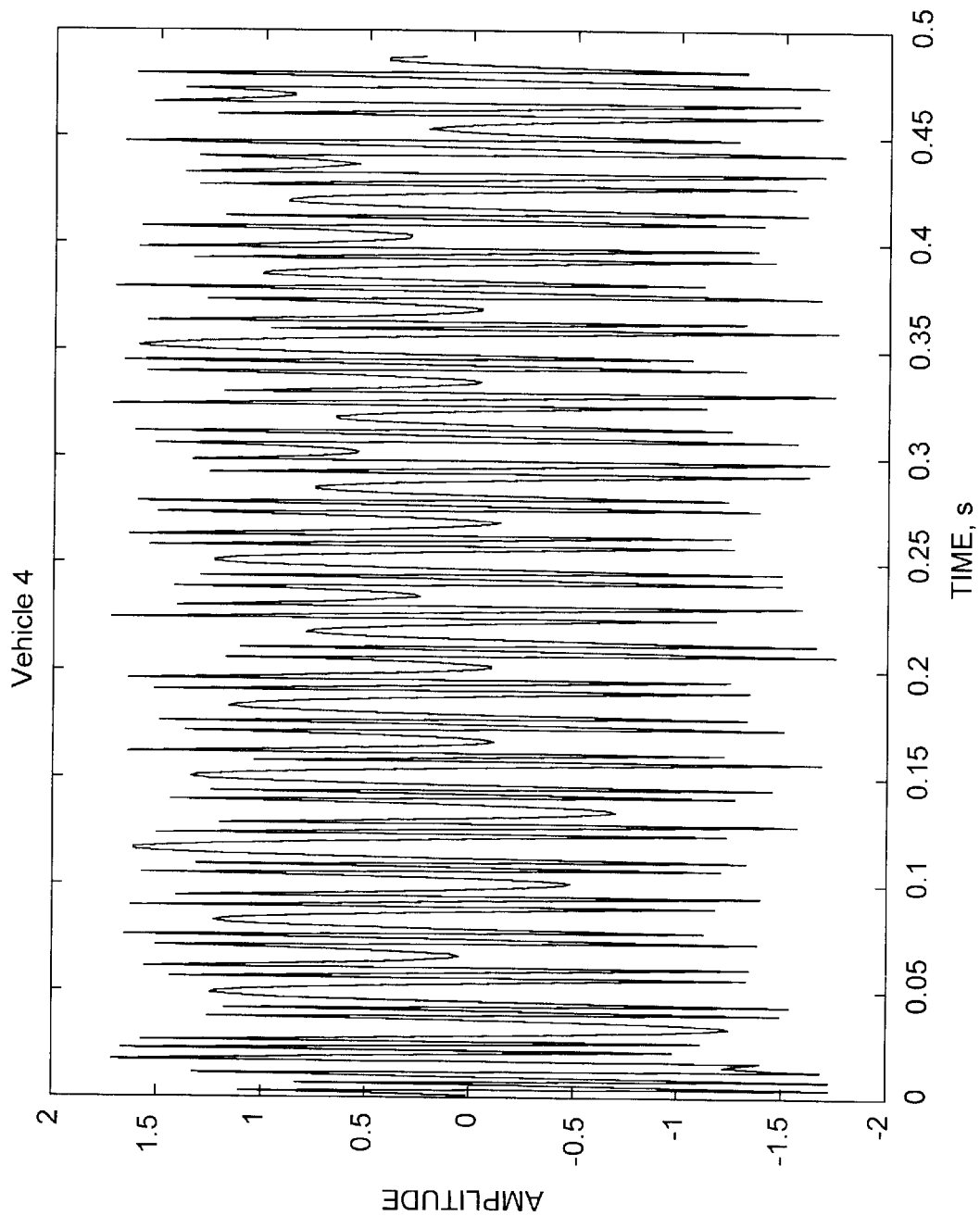
Figure 10E:
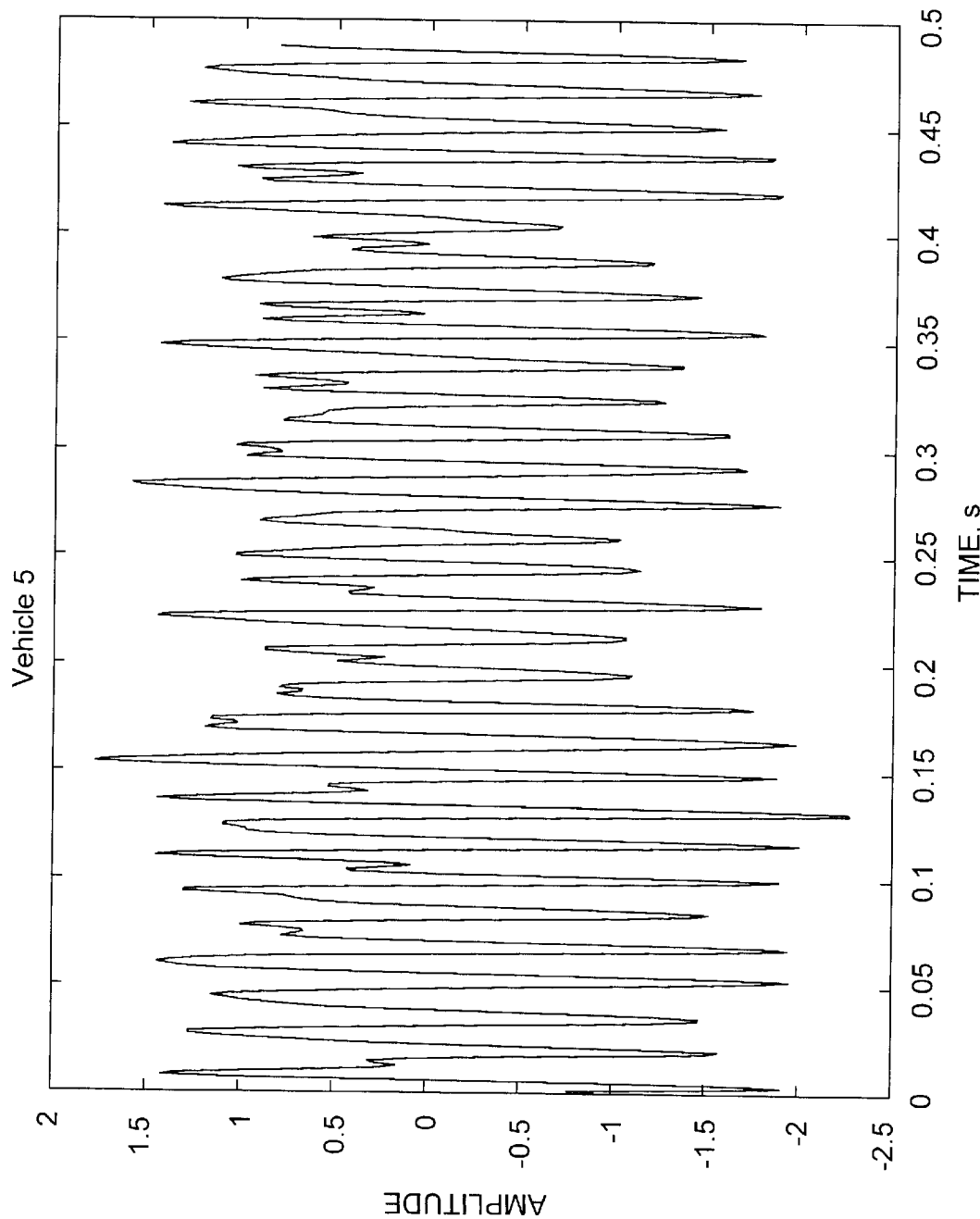
Figure 10F:
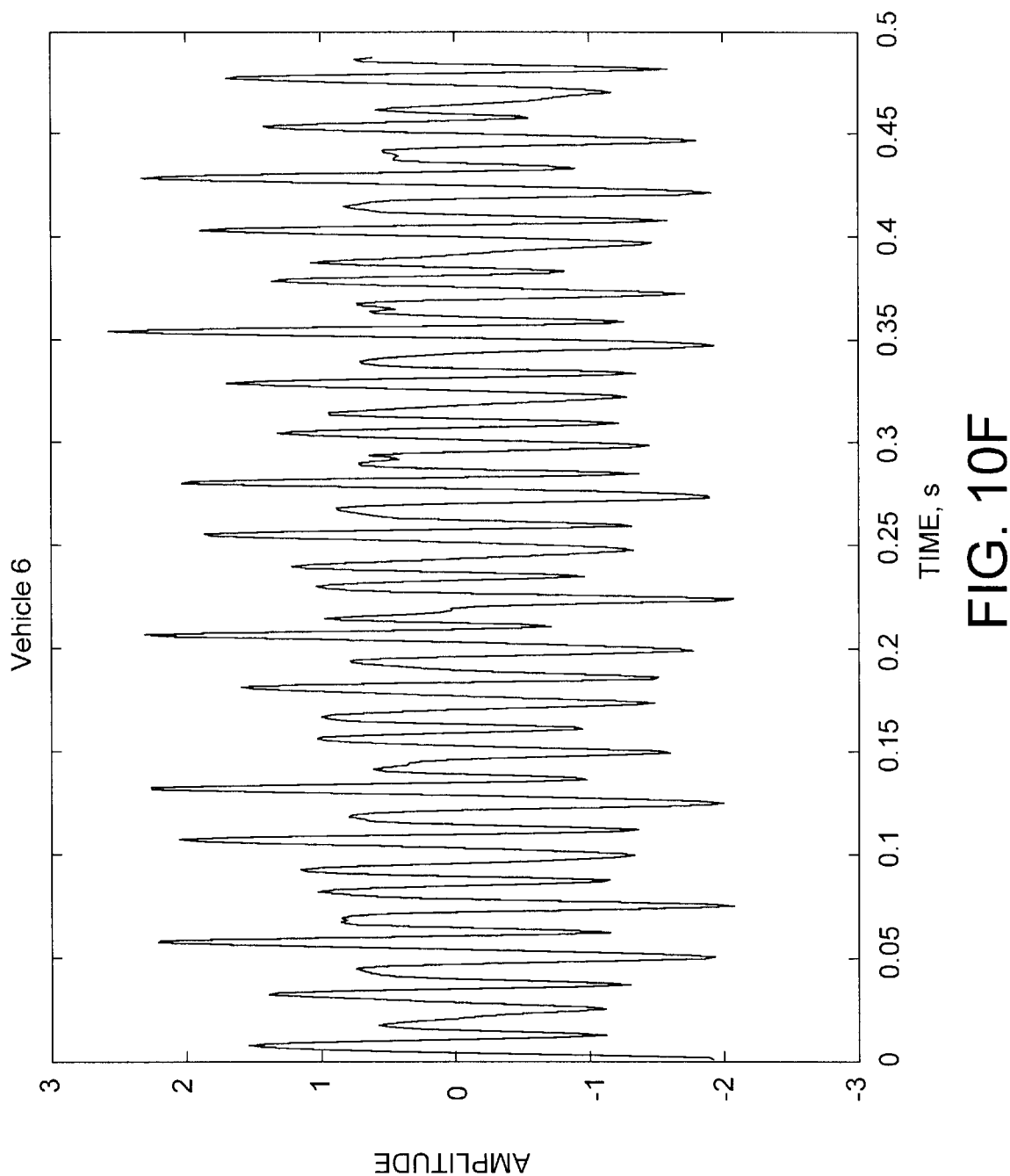

Another embodiment of the invention is shown in FIG. 9, which is similarly based on a digital processing technique, detects deterministic properties of two observed data signals from two sensors. This digital signal processing technique has been shown to be particularly advantageous for vehicle acoustic signature detection. The technique is similarly implemented using the digital signal processor 20 (FIG. 5). The two observed signals, $x_1(i)$ and $x_2(i)$, are digitized (block 402) and the digital data signals are normalized (block 404). An estimation of moments is performed (block 406), based on the delayed differential equations shown in Appendix A Eqns. 60 and 61, generating an R matrix shown in Appendix A Eqn. 62. The B matrix shown in Appendix B Eqns. 72 and 73 is calculated (block 408) and used with the R matrix to calculate (block 410) the A matrix in accordance with Appendix A, Eqns. 81 and 82. The A matrix is repeated for all data windows $N_W$. The A matrix is provided to a classifier which is implemented through a neural network (block 412).

More particularly, the post-processing decision scheme is provided by a Learning Vector Quantization (LVQ) neural net classifier. The LVQ may be constructed using the NeuralNet toolbox of the Matlab software. Several functions of the neural net toolbox which may be used include: initlvq, trainlvq, and simulvg. In the following description, the standard Matlab syntax is used.

The feature vector output from the above processing chain corresponding to N targets are written as $5 \times N_W$ input matrices A1, A2, . . . , .AN. The Matlab processing algorithm then consists of the following:

1. The input vector is formed:

$$P=[A1\ A2\ \ldots\ AN]$$

2. The index of targets is formed:

$$C=[1\ 1\ \ldots\ 1\ 2\ 2\ \ldots\ 2\ \ldots\ N\ N\ \ldots\ N.]$$

where each index 1, 2, . . . , .N is repeated Nw times. The index is then transformed into vectors of targets:

$$T=ind2vec(C)$$

$$[S2\ Nw]=size(T)$$

where S2 is the number of known target classes.

3. The size of the competitive neural net hidden layer S1 is chosen. Typically, this is at least several times the number of targets. W1 is a S1×5 weight matrix for competitive layer and W2 is a S2×S1 weight matrix for the linear layer which are obtained during initializing:

$$S1=5 \cdot N$$

$$[W1,\ W2]=initlvq(P,\ S1,\ T)$$

4. Training parameters are then chosen:
   df=50 Frequency of progress displays (in epochs)
   me=1000 Maximum number of epochs to train
   lr=0.05 Learning rate
The network is then trained:

$$TP=[df\ me\ lr]$$

$$[W1,\ W2]=trainlvq(W1,\ W2,\ P,\ T,\ TP)$$

At this point the neural net is ready to be used for classification. A single 5-dimensional input vector of features A is chosen corresponding to some observed signal, and input to the network, which then makes a decision quantified as the output of the linear output layer:

$$A=[1;2;3;4;5]$$

$$a=simulvq(A,\ W1,W2)$$

where the decision is indicated by a neuron, corresponding to the appropriate vehicle class, being activated.

Figure 11A:
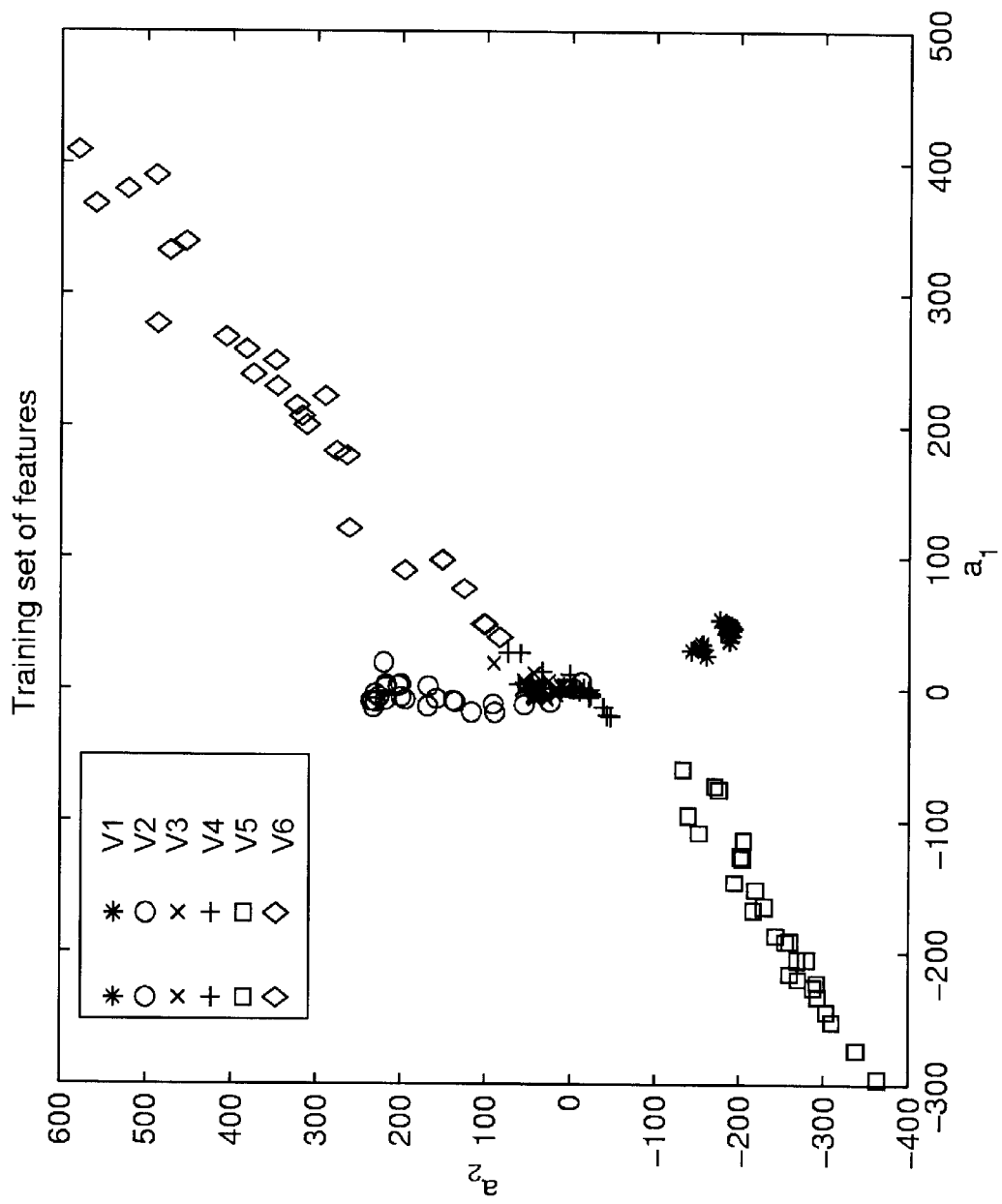
FIGS. 11A–B are graphs of $a_1$ parameter values versus $a_2$ parameters values for training and test data sets, respectively, for the six differing mobile land vehicles of FIGS. 10A–E, according to the present invention.
Figure 11B:
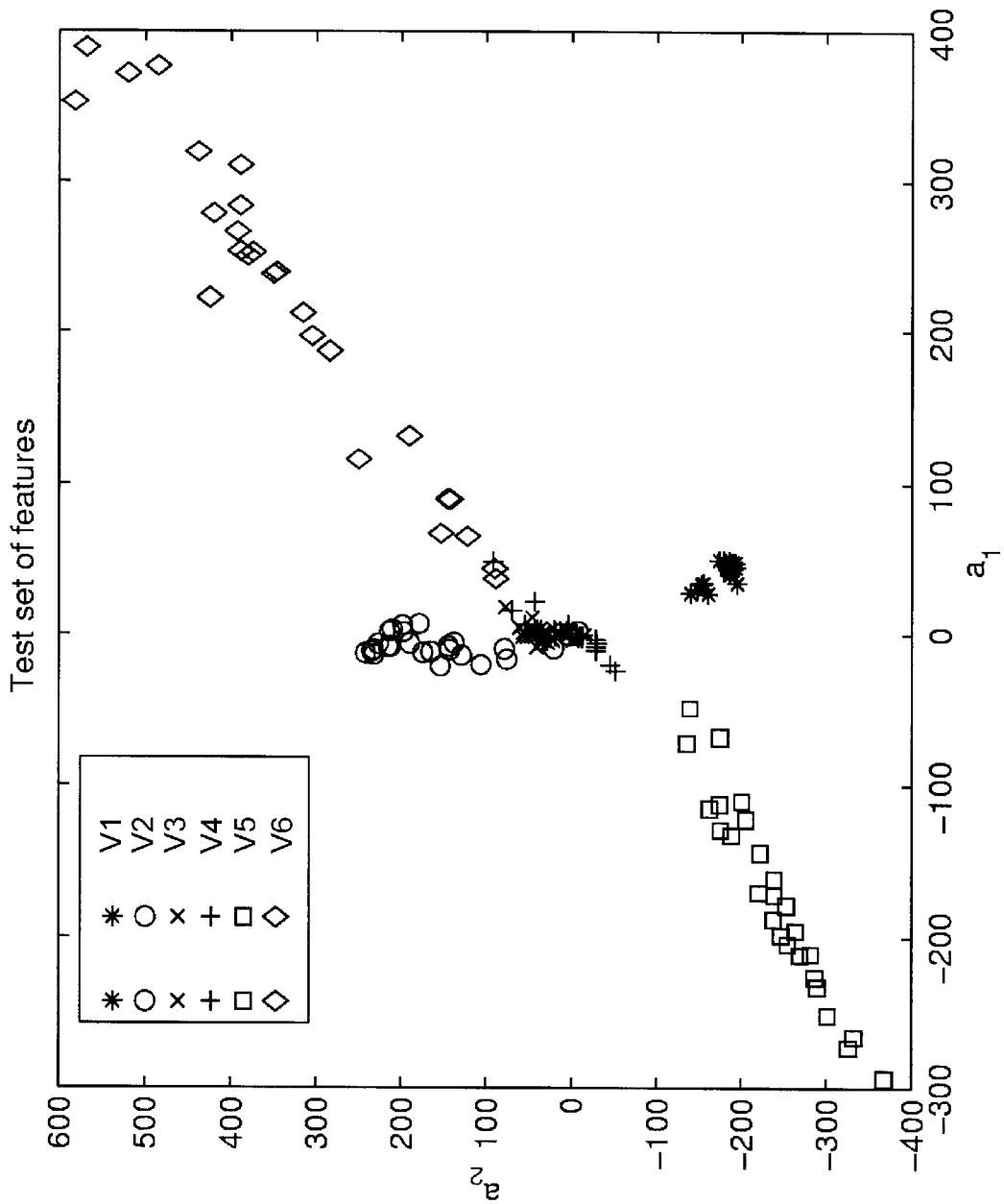

Sample acoustic recordings from 6 mobile land vehicles, shown in FIGS. 10A–10F, respectively, were used to test the classification of the 6 vehicles. All land vehicles are moving left to right at a speed of 15 km/hr. The sampling frequency is 1024 Hz. The model parameters are $L_W=500, L_s=100$ (window shift), $\tau=7$ and d=3.52 features are extracted from around the Closest Point of Approach (CPA) to a recording microphone (not shown). Odd windows were used for training the LVQ neural net, whereas even windows were used to test the classification of the features, shown in FIGS. 11A and 11B. The results are summarized in Table 2 (below) which comprises a "confusion matrix", indicating the correct and incorrect classification decisions output by the neural net, based on the true input classes. The table shows that the neural net classifier provides the correct class decision in most cases.

TABLE 2

|  | Vehicle 1 | Vehicle 2 | Vehicle 3 | Vehicle 4 | Vehicle 5 | Vehicle 6 |
| --- | --- | --- | --- | --- | --- | --- |
| Vehicle 1 | 26 | 0 | 0 | 0 | 0 | 0 |
| Vehicle 2 | 0 | 23 | 1 | 2 | 0 | 0 |
| Vehicle 3 | 0 | 3 | 19 | 4 | 0 | 0 |
| Vehicle 4 | 0 | 1 | 5 | 20 | 0 | 0 |
| Vehicle 5 | 0 | 0 | 0 | 0 | 26 | 0 |
| Vehicle 6 | 0 | 1 | 0 | 0 | 0 | 25 |

Figure 12:
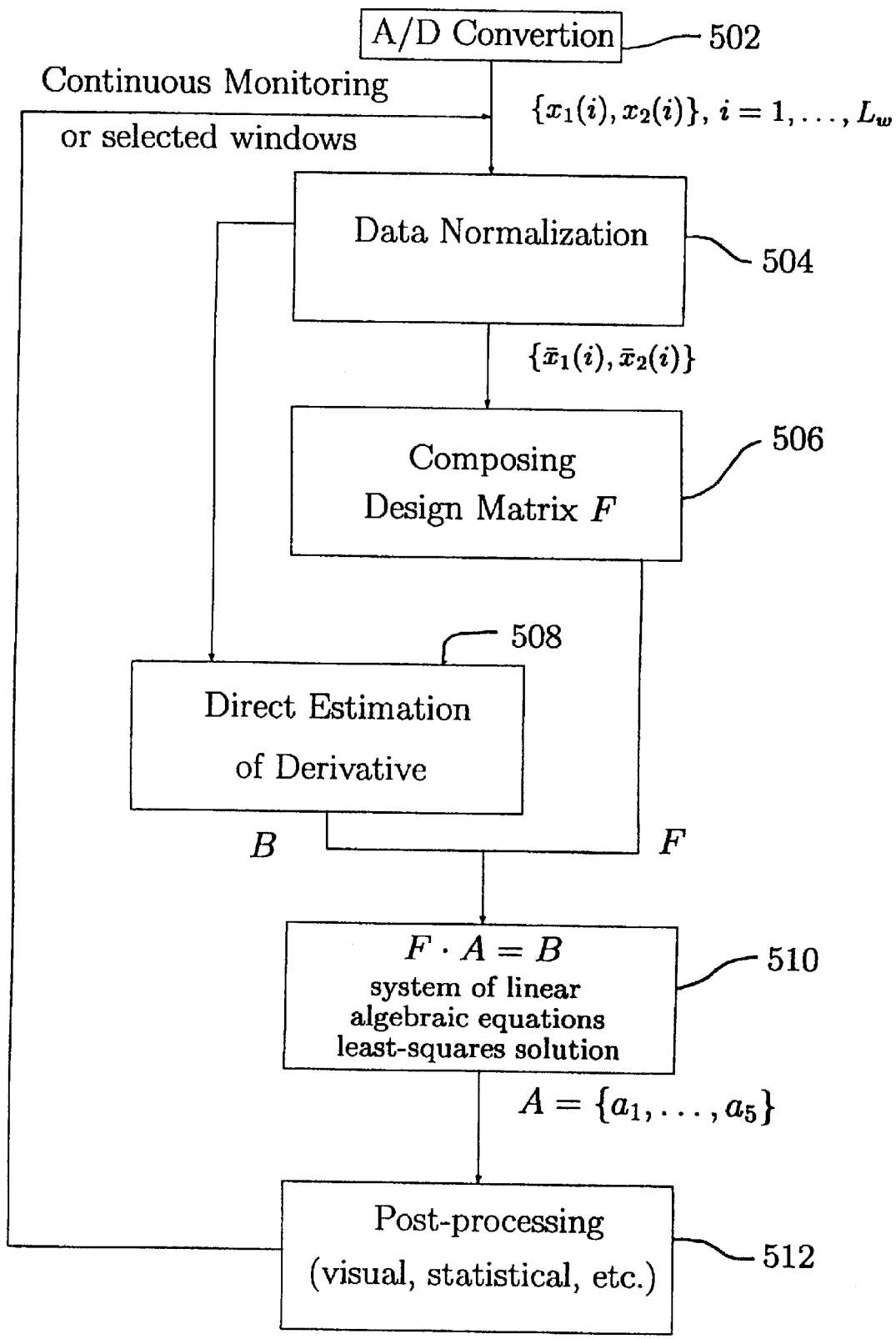
FIG. 12 is a flow chart showing a process for implementing an acoustic signal classifier for detailed characterization of transient (non-stationary) underwater signals, using the digital processor of FIG. 5, according to the invention.

Another embodiment of the invention based on a digital signal processing technique for revealing deterministic properties of observed data signals is shown in FIG. 12. This embodiment is based on the architecture of Section 2.4 of Appendix A and is particularly advantageous for analyzing non-stationary dolphin echo-location signals. The analog location signals are digitized (block 502) by the A/D converter 202 (FIG. 5) and resulting digitized signals are normalized (block 504). A design matrix F is composed (block 506) based on the model specification given in Appendix A Eqn. 9. The derivative matrix B is estimated directly from the normalized data (block 508). Using the design matrix F and the derivative matrix B, the correlation coefficient matrix A is calculated (block 510). Next, the correlation coefficient is used by post-processing steps (block 512) such as those discussed with respect to Appendix A, FIG. A-2, block 106. This process may be applied to monitoring a continuous data stream or applied to selected data windows.

Figure 13:
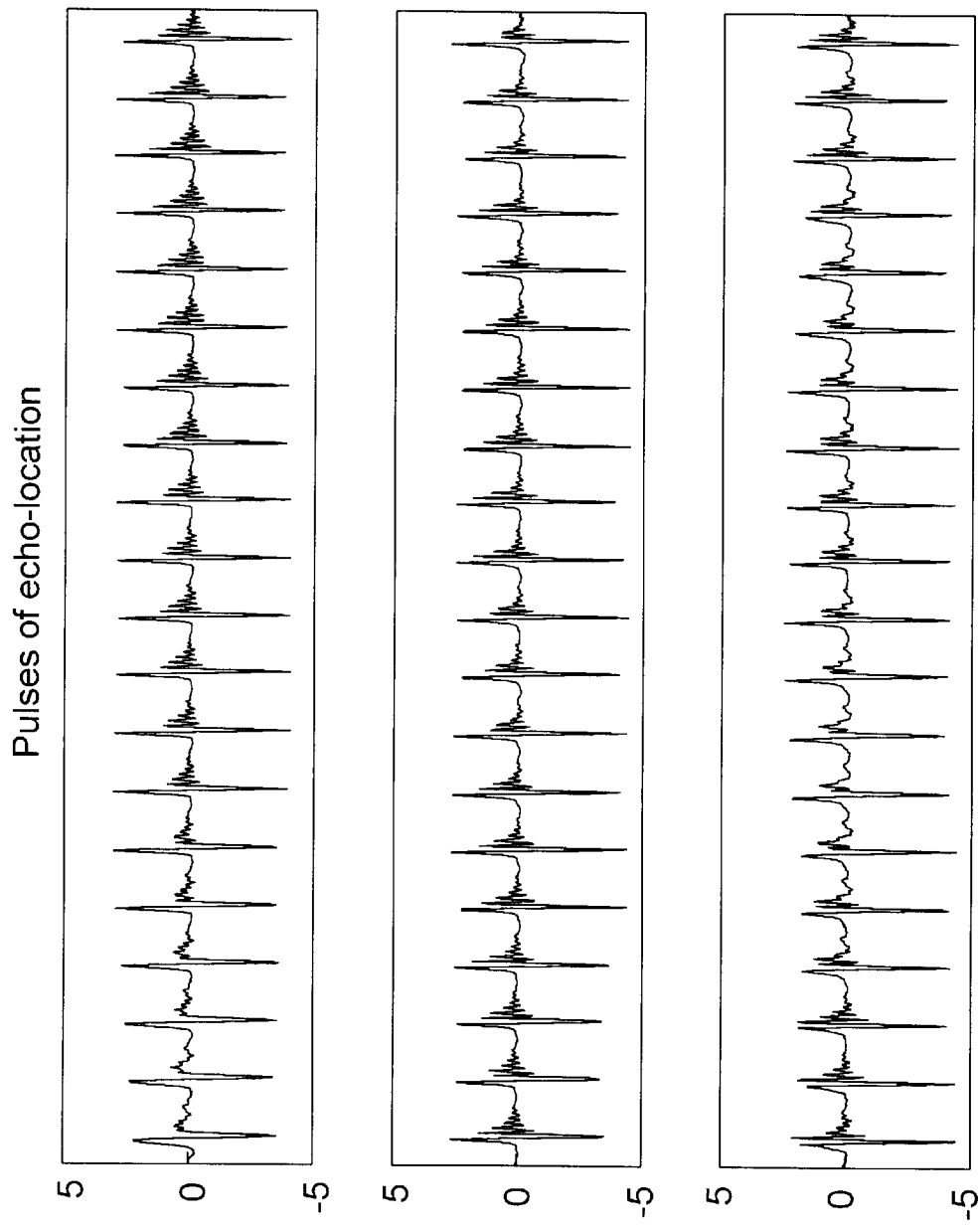
FIG. 13 is a graph of echo-location pulses, versus time, generated by a dolphin.
Figure 14:
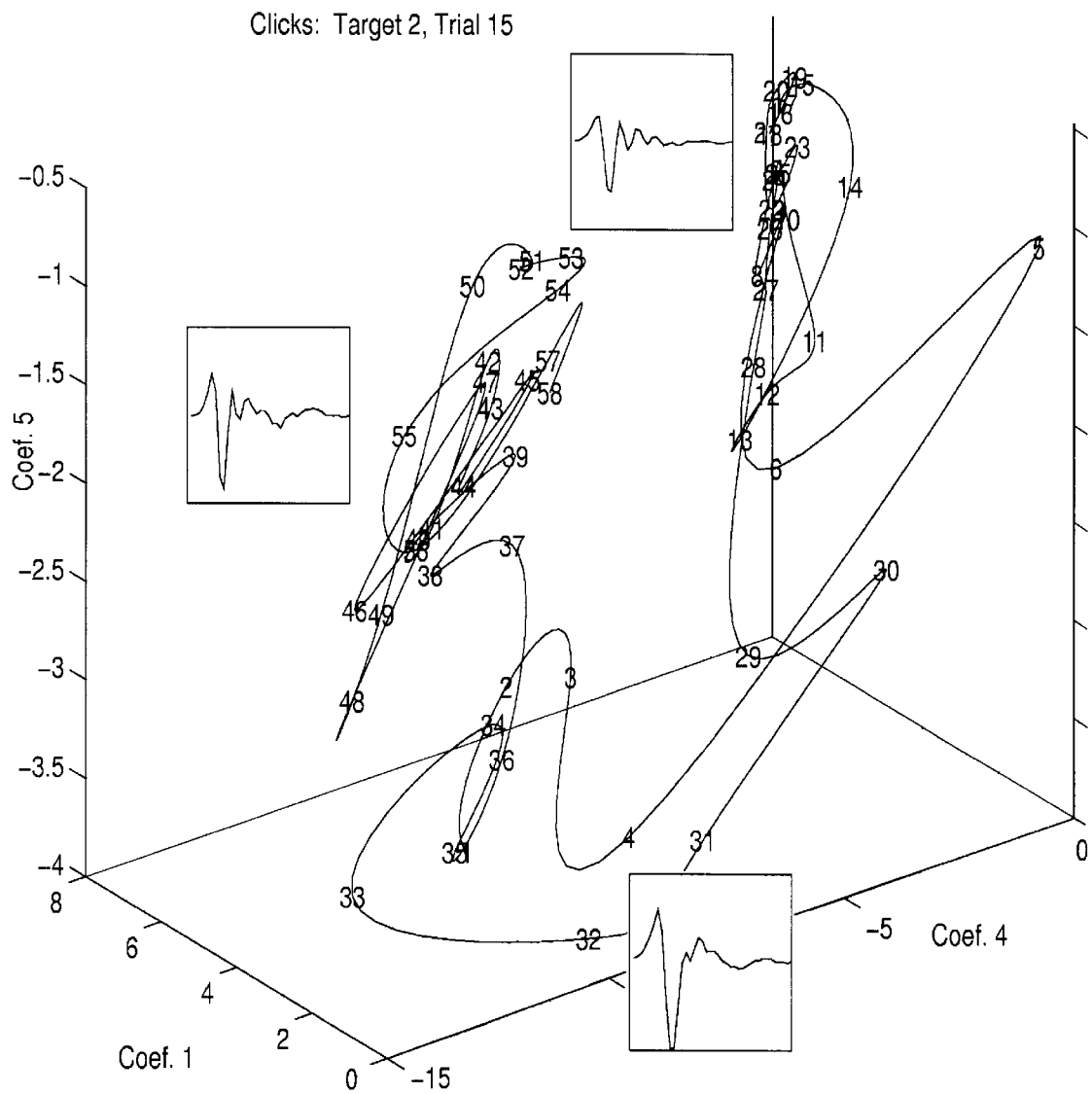
FIG. 14 is a three dimensional graph showing the values of three of the five available estimated model coefficients for the pulses shown in FIG. 13.

The test data consists of a pulse train of short transient acoustic pulses, shown in FIG. 13, produced by dolphins as they attempt to echo-locate objects in an ocean environment. The parameters of the algorithm are $\tau=1$ and $L_W=50$, the pulses are 70–100 ms long, and the sampling frequency is 500 kHz. The results, in the form of a feature trajectory, are shown on an operator's display and are illustrated by FIG. 14. A systematic search strategy during the first few dolphin pulses is evident.

Figure 15:
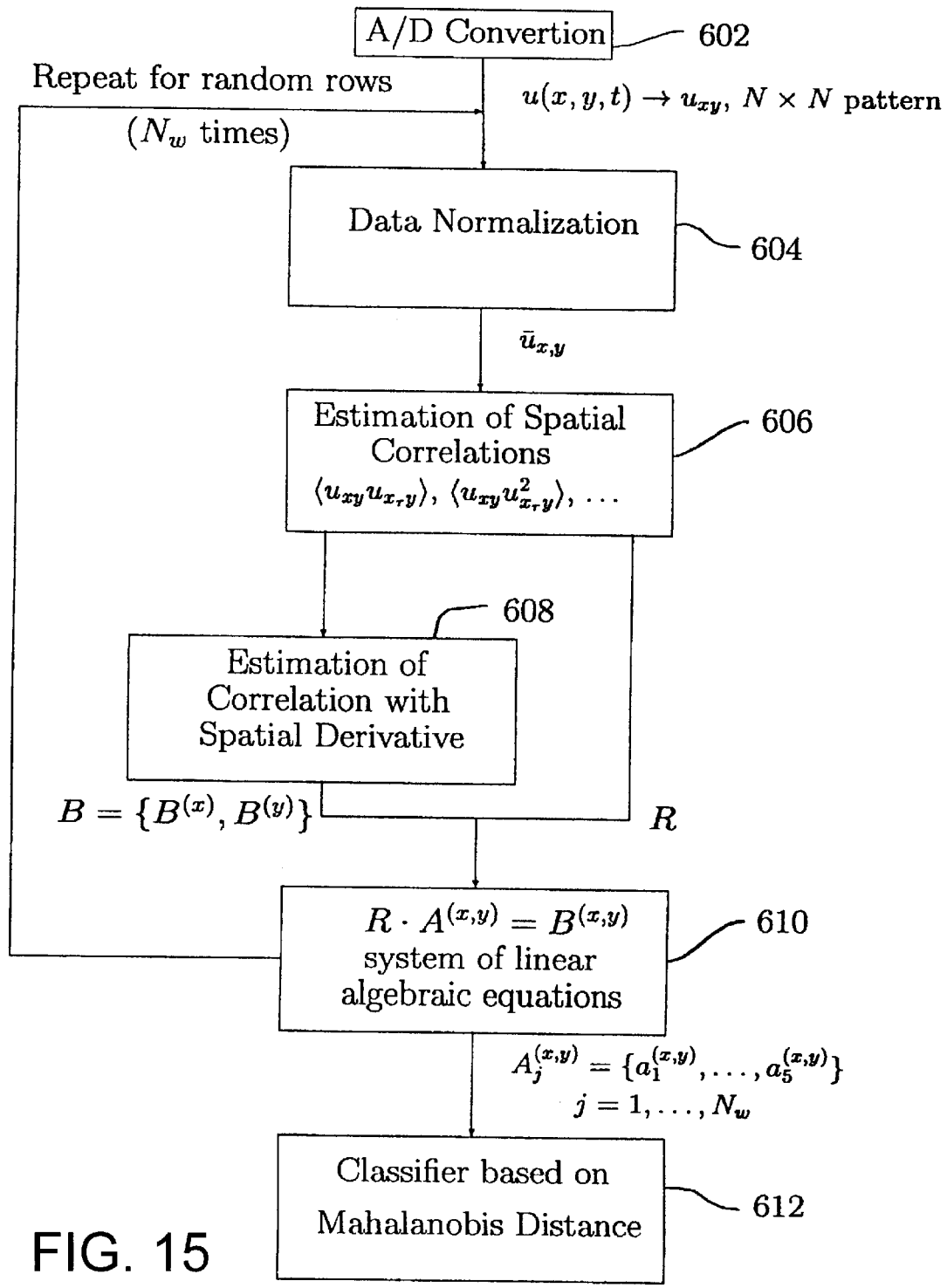
FIG. 15 is a flow chart showing a process for implementing a spatial pattern or image recognition system based on dynamical generator models, using the digital processor of FIG. 5, according to the invention.

Another embodiment of the invention based on a digital signal processing technique for revealing deterministic properties of observed data signals is shown in FIG. 15. This embodiment is based on the architecture of Section 2.5 of Appendix A and is particularly advantageous for analyzing spatial patterns. The image data signals are digitized (block 602) by the A/D converter 202 (FIG. 5) and resulting digitized signals are normalized (block 604). Rows of data extracted from the image matrix are used as input. A spatial correlation matrix R is composed (block 606) based on the model specification given in Appendix A Eqns. 86 and 87. A spatial derivative matrix B is estimated directly from the normalized data (block 608). Using the correlation matrix R and the derivative matrix B, the correlation coefficient matrix A is calculated (block 610). Next, the correlation coefficient is used by a post processing step (block 612) such as a classifier based on a Mahalanobis Distance.

The test data is constructed using the following Matlab commands:

1. Domain definition:
    pderect([-1 1 1-1],0R10)
    set(findobj(get(pde_fig, 'Children')
    ,'Tag',PDEEval'),'String','R1'))
2. Boundary conditions:
    pdetool('changemode', 0)
    pdesetbd 4,'neu',1,'0','0')
    pdesetbd (3,'neu',1,'0','0')
    pdesetbd (2,'neu',1,'0','0')
    pdesetbd (1,'neu', 1,'0','0')
3. Mesh generation:
    setuprop(pde_fig,'Hgrad',1.3)
    setuprop(pde_fig,'refinemethod','regular')
    pdetool('initmesh')
    pdetool('refine')
    pdetool('refine')
4. Definition of the partial differential equation:
    pdeseteq (3,'1.0','0.0','0.0','1.0','0:5', . . .
    'sin(4*pi*(x+2*y))+sin(8*pi*(x−2*y))', . . .
    'cos(4*pi*(x+2*y))+cos(8*pi*(x−2*y))','[0 100]')
    setuprop(pde_fig,'currparam',
    ['1.0';'0.0';'0.0';'1.0'])
5. Set parameters:
    setuprop(pde_fig,'solveparam', . . .
    str2mat('0','8208','10','pdeadworst', . . .
    '0.5','longest','0','1E-4',", 'fixed','Inf'))
6. Solve the equation:
    pdetool('solve')

The solution has been converted from a triangularized grid to a uniform rectangular grid with the following commands:

$x=-1:2/64:1$ $y=-1:2/64:1$ $uxy=\text{tri2grid}(p,t,u,x,y)$

Figure 16A:
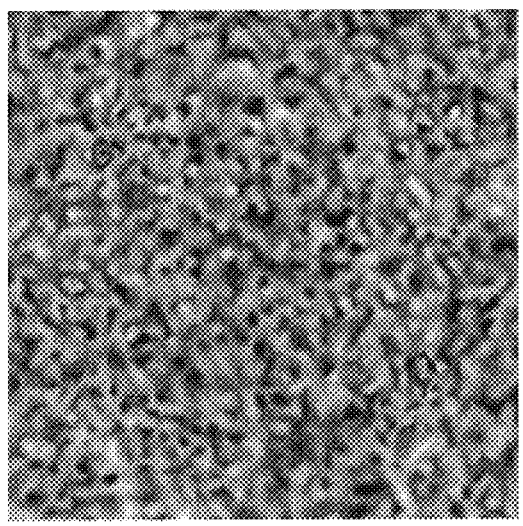
FIG. 16A is a plot of a random field of image data.
Figure 16B:
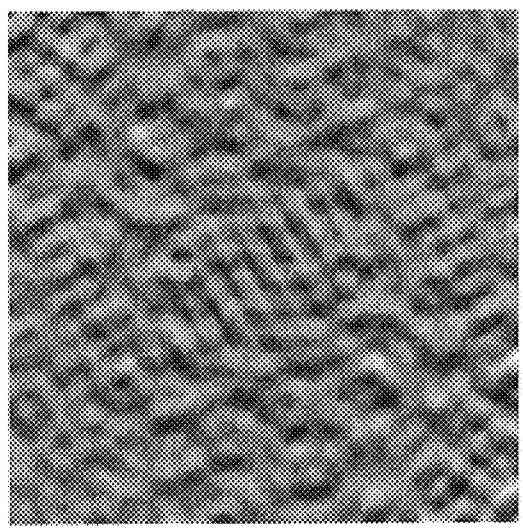
FIG. 16B is a plot of image data generated by numerically solving a set of wave equations.

To increase the sampling rate, the image has been extrapolated to a higher resolution grid using a cubic interpolation routine with the following commands:

$[xi, yi]=\text{meshgrid}(-1:2=512:1, -1:2=512:1)$ $uxyi=\text{interp2}(x, y, uxy, xi, yi, \text{'cubic'})$ A graphical plot showing the 2D image produced by these commands is shown in FIG. 16B. In order to test the discrimination capability of the algorithm, it is also necessary to construct a data set consisting of a purely random field. The random field is generated with the following Matlab commands:

$un=\text{randn}(size\ (u))$ $unxy=\text{tri2grid}(p, t, un, x, y)$ $unxyi=\text{interp2}(x, y, unxy, xi, yi, \text{'cubic'})$ This random field has similar spectral properties as that of the uncorrupted image. The random field image is shown in FIG. 16A.

Figure 16C:
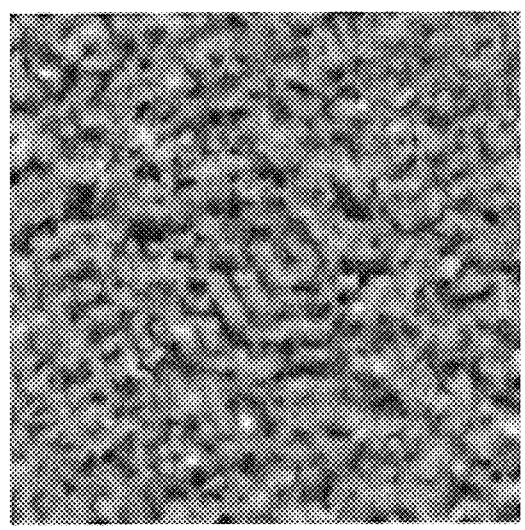
FIG. 16C is the image data of FIG. 16B corrupted by 100% noise shown in the plot of FIG. 16A.

To make the simulation more realistic, a random field component is added to the pure wave equation solution, representing possible measurement errors. The resulting (final) input data is shown in FIG. 16C, where a random component has been added with 100% of the variance of the pure wave component.

To analyze these data sets, a model is required which incorporates spatial information from the images. In its most general setting, the model defined by Appendix A Eqn. 11 may be utilized. Here, since the single images have no time dependency, a much simpler but cruder model form may be utilized. The algorithmic device has as its data model the DDE of Appendix A, Eqn. 9. The independent variables are assumed to all be spatial as indicated in Appendix A Eqns. 88 and 89.

The algorithmic device is intended to sense local structure in the continuous field constituting the image. Hence, to avoid possible biases due to boundary conditions and spurious symmetries in the data, we construct a set of data (observation) window constructed by choosing a random set of rows (or columns) of the image.

Using this set of input data, the model coefficients of Appendix A Eqn. 86 are estimated using the correlation method described in Section 1.1. The independent variable is the x-index of the image. Otherwise, the algorithmic operations are identical to the procedure of Section 1.1 in which the independent variable is time.

For the example of FIG. 16A, the input data consists of a 513×513 pixel image, and 100 observation windows are chosen using random rows to generate a data ensemble. The data derivative is approximated using a d=5, while $\tau$=15. After processing, the algorithm outputs an ensemble of 5 dimensional feature vectors corresponding to Block 105 of FIG. A-2. Two such distributions of feature vectors are obtained, corresponding, respectively, to the purely random and noisy wave equation data. The ($a_1$, $a_2$) projection of these two ensembles is plotted in FIG. 16D. In this case, the local dynamical structure of the noisy wave equation is sensed, and is apparent by the separation of the two feature distributions.

Figure 16D:
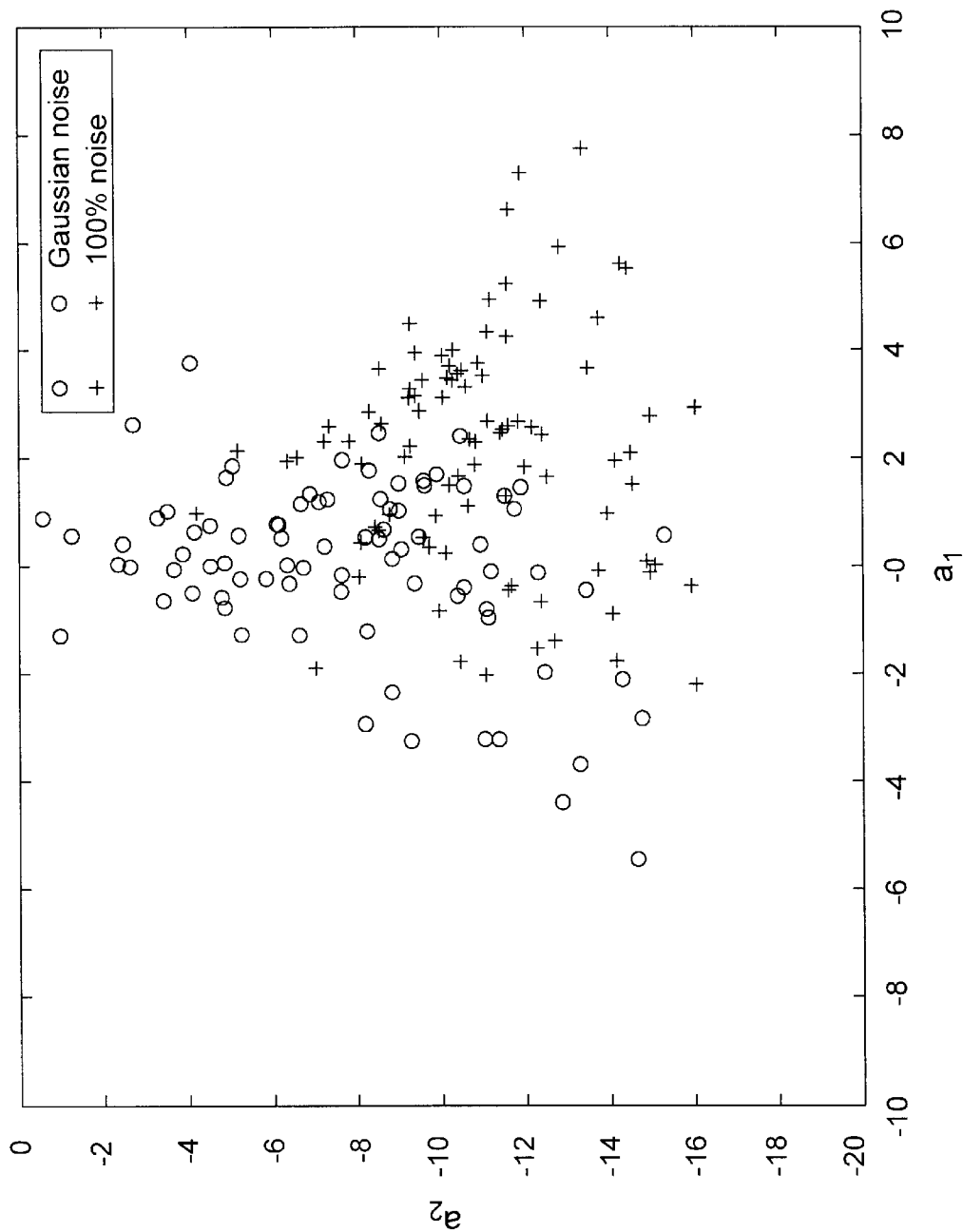
FIG. 16D is a graph of a, parameter values verses $a_2$ parameters values for the corrupted image of FIG. 16A, indicated by the symbol (○), and the random image data of FIG. 16C, indicated by the symbol (+).
Figure 17:
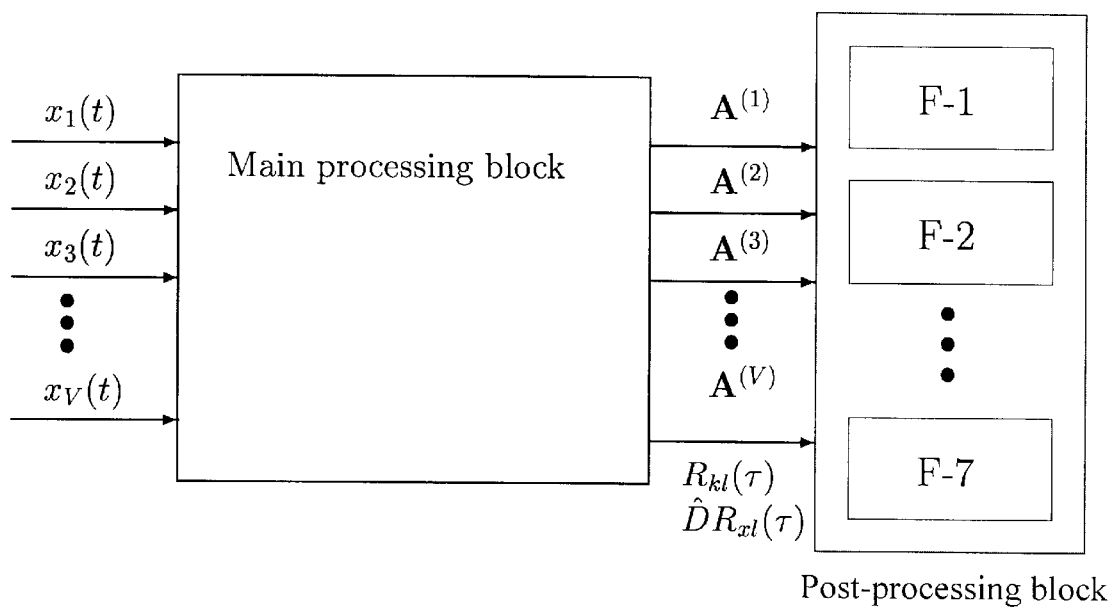
FIG. 17 is a flow diagram of general signal processing techniques showing correlations for coefficient estimation and showing post-processing according to the present invention.
Figure 18:
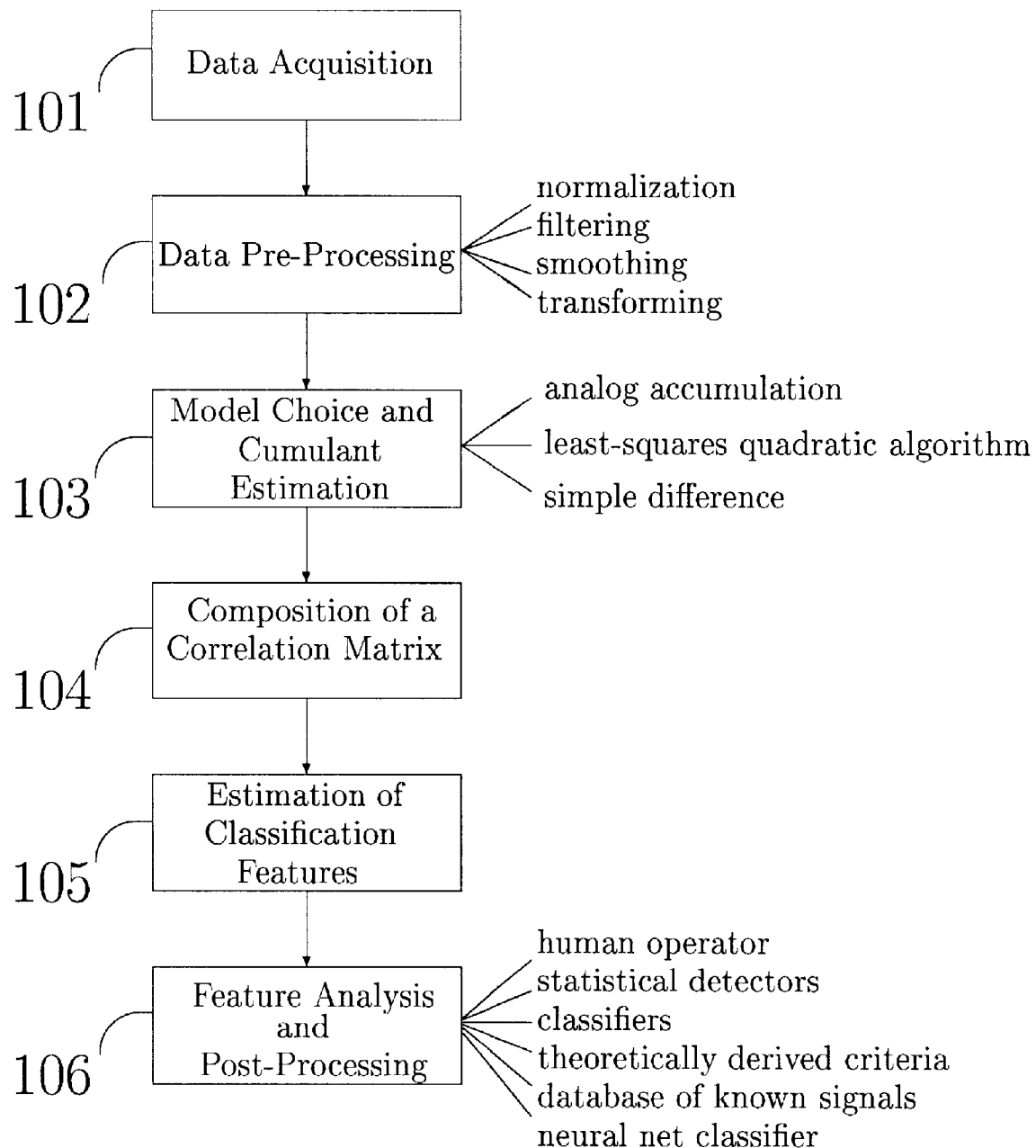
FIG. 18 is a block diagram showing the general signal processing scheme, according to the invention, for revealing deterministic properties of observed data signals.
Figure 19:
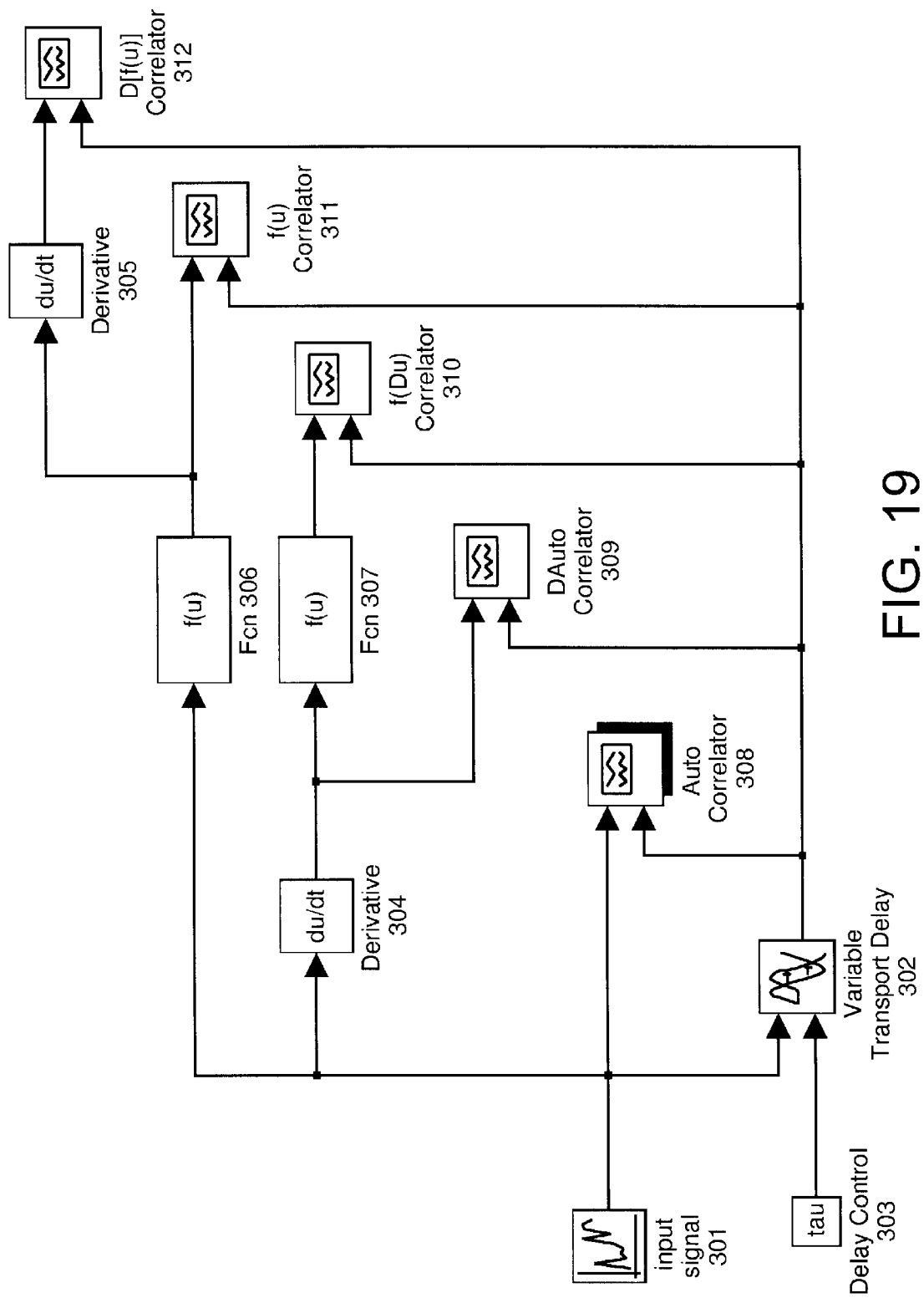
FIG. 19 is a schematic of a general analog signal processor for detecting and classifying deterministic properties of observed data signals using correlation parameters.

The means and standard deviations for the feature distributions shown in FIG. 16D are shown in Table 3 below.

TABLE 3

|  | $a_1$ | $a_2$ |
|---|---|---|
| 100% noise Mean | 1.73 +/− 0.23 | −11.42 +/− 0.26 |
| $\sigma$ | 2.25 | 2.64 |
| pure noise Mean | 0.08 +/− 0.19 | −8.34 +/− 0.47 |
| $\sigma$ | 1.86 | 4.72 |

To estimate the statistical significance of the discrimination of the two feature distributions, a statistical measure is implemented based on the Mahalanobis distance [Ray, S.; Turner, L. F. "Mahalanobis Distance-Based Two New Feature Evaluation Criteria", Information Sciences 60, p.217 (1992)], which yields a confidence interval for discrimination. Using the Mahalanobis measure, it can be estimated that the two distributions shown in the bottom right of FIG. 16D are distinct to a 0.9999 confidence level. Hence, the two input data sets are structurally distinct to a high level of statistical confidence. Table 4 below summarizes the discrimination level of the device for the analysis of 200% and 300% noisy data sets (not shown):

TABLE 4

| noise level | 100% | 200% | 300% |
|---|---|---|---|
| confidence level | 0.999 | 0.938 | 0.811 |

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. Apparatus for processing an input signal, comprising:
   a first differentiator that receives the input signal and generates a first derivative signal which is based on a derivative of the input signal;
   a delay circuit that delays the input signal by a predetermined time period to generate a delayed signal;
   a first correlator that correlates the delayed signal with the first derivative signal to generate a first correlated signal.

2. Apparatus for processing an input signal as defined in claim 1, further comprising:
   a first function generator that receives the input signal and generates a first processed signal based on a first predetermined function;
   a second correlator that correlates the delayed signal with the first processed signal to generate a second correlated signal.

3. Apparatus for processing an input signal as defined in claim 1, further comprising:
   a first function generator that receives the first derivative signal and generates a first processed signal based on a first predetermined function;
   a second correlator that correlates the delayed signal with the first processed signal to generate a second correlated signal.

4. Apparatus for processing an input signal as defined in claim 2, wherein the first predetermined function is a square of the input signal received by the first function generator.

5. Apparatus for processing an input signal, comprising:
   a first function generator that receives the input signal and generates a first processed signal based on a first predetermined function;
   a delay circuit that delays the input signal by a predetermined time period to generate a delayed signal;
   a first correlator that correlates the first processed signal with the delayed signal to generate a first correlated signal.

6. Apparatus for processing an input signal as defined in claim 5, wherein the first predetermined function is a square of the input signal received by the first function generator.

7. Apparatus for processing an input signal as defined in claim 5,
   a first differentiator that receives the first processed signal and generates a first derivative signal which is based on a derivative of the first processed signal;
   a second correlator that correlates the delayed signal with the first processed signal to generate a second correlated signal.

8. Apparatus for processing an input signal as defined in claim 5,
   a first differentiator that receives the input signal and generates a first derivative signal which is based on a derivative of the input signal;

a second correlator that correlates the delayed signal with the derivative signal to generate a second correlated signal.

9. Apparatus for processing an input signal, comprising:

a first differentiator that receives the input signal and generates a first derivative signal which is based on a derivative of the input signal;

a delay circuit that delays the input signal by a predetermined time period to generate a delayed signal;

a first correlator that correlates the input signal with the derivative signal to generate a first correlated signal;

a first function generator that receives the input signal and generates a first processed signal based on a first predetermined function; and a second correlator that correlates the delayed signal with the first processed signal to generate a second correlated signal.

10. Apparatus for processing an input signal as defined in claim 9, further comprising a detector for classifying the input signal based on the first and second correlated signals.

11. Apparatus for processing an input signal, comprising:

a delay circuit that delays the input signal by a predetermined time period to generate a delayed signal;

a first correlator that correlates the input signal with the delayed signal to generate a first correlated signal;

a first differentiator that receives the input signal and generates a first derivative signal which is based on a derivative of the input signal;

a second correlator that correlates the delayed signal with the derivative signal to generate a second correlated signal;

a first function generator that receives the input signal and generates a first processed signal based on a first predetermined function;

a third correlator that correlates the delayed signal with the first processed signal to generate a third correlated signal;

a second function generator that receives the derivative signal and generates a second processed based on a second predetermined function;

a fourth correlator that correlates the delayed signal with the second processed signal to generate a fourth correlated signal;

a second differentiator that receives the first processed signal to generate a second derivative signal based on a derivative of the first processed signal; and a fifth correlator that correlates the delayed signal with the second derivative signal to generate a fifth correlated signal.

12. Apparatus for processing an input signal as defined in claim 11, wherein the first and second predetermined functions are a square of the respective signals received by the first and second function generator.

13. Method for processing an input signal, comprising:

receiving the input signal and generating a first derivative signal which is based on a derivative of the input signal;

generating a delayed signal by delaying the input signal by a predetermined time period to;

generating a first correlated signal by correlating the input signal with the derivative signal;

receiving the input signal and generating a first processed signal based on a first predetermined function applied to the input signal; and generating a second correlated signal by correlating the delayed signal with the first processed signal.

14. A method for processing an input signal as defined in claim 13, further comprising processing the first and second correlated signals to detect deterministic properties in the input signal.

* * * * *